United States Patent
Shin et al.

(10) Patent No.: US 7,797,468 B2
(45) Date of Patent: Sep. 14, 2010

(54) METHOD AND SYSTEM FOR ACHIEVING FAIR COMMAND PROCESSING IN STORAGE SYSTEMS THAT IMPLEMENT COMMAND-ASSOCIATED PRIORITY QUEUING

(75) Inventors: George Shin, Boise, ID (US); Rajiv K. Grover, Folsom, CA (US); Santosh Ananth Rao, Santa Clara, CA (US)

(73) Assignee: Hewlett-Packard Development Company, Houston, TX (US)

( * ) Notice: Subject to any disclaimer, the term of this patent is extended or adjusted under 35 U.S.C. 154(b) by 467 days.

(21) Appl. No.: 11/590,957

(22) Filed: Oct. 31, 2006

(65) Prior Publication Data

US 2008/0104283 A1   May 1, 2008

(51) Int. Cl.
*G06F 13/14* (2006.01)
*G06F 12/00* (2006.01)
*G06F 13/00* (2006.01)

(52) U.S. Cl. .................. 710/40; 710/6; 710/15; 710/16; 710/17; 710/18; 710/19; 710/29; 710/36; 710/39; 710/41; 710/42; 710/43; 710/52; 710/53; 710/57; 710/58; 710/59; 710/60; 710/62; 710/63; 710/64; 710/72; 710/74; 710/111; 710/240; 710/241; 710/242; 710/243; 710/244; 711/100; 711/111; 711/112; 711/114; 711/154; 711/158; 711/167; 711/168

(58) Field of Classification Search .................. None
See application file for complete search history.

(56) References Cited

U.S. PATENT DOCUMENTS

| | | | | |
|---|---|---|---|---|
| 6,157,963 | A * | 12/2000 | Courtright et al. | 710/5 |
| 6,192,422 | B1 * | 2/2001 | Daines et al. | 710/29 |
| 6,611,903 | B2 * | 8/2003 | Fujimoto et al. | 711/162 |
| 6,636,909 | B1 * | 10/2003 | Kahn et al. | 710/60 |
| 7,047,322 | B1 * | 5/2006 | Bauman et al. | 710/6 |
| 7,222,223 | B2 * | 5/2007 | Miller et al. | 711/158 |
| 7,337,248 | B1 * | 2/2008 | Rao et al. | 710/53 |
| 2004/0044770 | A1 * | 3/2004 | Messick et al. | 709/226 |
| 2007/0174529 | A1 * | 7/2007 | Rodriguez et al. | 710/240 |

* cited by examiner

*Primary Examiner*—Tanh Q Nguyen

(57) ABSTRACT

In certain, currently available data-storage systems, incoming commands from remote host computers are subject to several levels of command-queue-depth-fairness-related throttles to ensure that all host computers accessing the data-storage systems receive a reasonable fraction of data-storage-system command-processing bandwidth to avoid starvation of one or more host computers. Recently, certain host-computer-to-data-storage-system communication protocols have been enhanced to provide for association of priorities with commands. However, these new command-associated priorities may lead to starvation of priority levels and to a risk of deadlock due to priority-level starvation and priority inversion. In various embodiments of the present invention, at least one additional level of command-queue-depth-fairness-related throttling is introduced in order to avoid starvation of one or more priority levels, thereby eliminating or minimizing the risk of priority-level starvation and priority-related deadlock.

18 Claims, 22 Drawing Sheets

WQdepth = (nextIn − nextOut + 32) MOD 32

METHOD AND SYSTEM FOR ACHIEVING FAIR COMMAND PROCESSING IN STORAGE SYSTEMS THAT IMPLEMENT COMMAND-ASSOCIATED PRIORITY QUEUING

TECHNICAL FIELD

The present invention is related to I/O scheduling, queue management, and command processing within data-storage systems and, in particular, to a method for implementing, and a data-storage system that implements, fair command processing in data-storage systems in which priorities are associated with commands, commands are processed according to associated priorities, and in which, as a result, priority-level starvation may occur.

BACKGROUND OF THE INVENTION

In initial computer-system generations, data-storage devices, such as magnetic-tape and magnetic-disk data-storage devices, were directly connected to computer systems. As computer-system technologies rapidly evolved as a result of advances in integrated-circuit technologies and in the speeds and functionalities of processors, data-storage devices also rapidly evolved as a result of computer-system advances and rapid increases in data densities, storage capacities, and access speeds of data-storage media and subsystems. With the development of high-speed electronic communications, computer systems have evolved to encompass multiple, discrete computer systems interconnected by electronic communications media that together comprise distributed computer systems. Similarly, data-storage devices have evolved to include large-scale data-storage systems, each data-storage system including, or interconnected with, multiple data-storage devices, and interconnected by high-speed electronic communications media to multiple, remote computer systems, including both discrete and distributed host computer systems.

As the hardware characteristics and capabilities of both computer systems and data-storage devices have increased and evolved, and as larger and more demanding applications that take advantage of the increased speeds, capacities, and functionalities of computer systems and data-storage systems have been developed, the interfaces provided by data-storage systems to remote host computers has evolved and broadened to provide increased features needed by the more demanding application programs. For example, online-transaction-processing applications and database-management systems may be designed to provide guaranteed performance to various classes of transactions and users based, in part, on prioritizing commands issued by the applications through host computers to data-storage systems to ensure maximum-possible responsiveness by the data-storage systems in executing high-priority commands. However, association of priorities with commands issued to data-storage systems may, in addition to prioritizing data-storage-system execution of the commands, inadvertently lead to numerous, additional interdependencies between and within processes and potential for priority-level starvation and priority-related deadlock. For these reasons, designers, manufacturers, vendors, and, ultimately, users of data-storage systems have recognized the need for enhanced data-storage-system controllers that prioritize execution of commands in a way that minimizes or eliminates additional risks of priority-level starvation and priority-related deadlock.

SUMMARY OF THE INVENTION

In certain, currently available data-storage systems, incoming commands from remote host computers are subject to several levels of command-queue-depth-fairness-related throttles to ensure that all host computers accessing the data-storage systems receive a reasonable fraction of data-storage-system command-processing bandwidth to avoid starvation of one or more host computers. Recently, certain host-computer-to-data-storage-system communication protocols have been enhanced to provide for association of priorities with commands. However, these new command-associated priorities may lead to starvation of priority levels and to a risk of deadlock due to priority-level starvation and priority inversion. In various embodiments of the present invention, at least one additional level of command-queue-depth-fairness-related throttling is introduced in order to avoid starvation of one or more priority levels, thereby eliminating or minimizing the risk of priority-level starvation and priority-related deadlock.

DETAILED DESCRIPTION OF THE INVENTION

Various embodiments of the present invention introduce one or more additional levels of command-queue-depth-fairness-related throttling within a data-storage-system controller in order to avoid starvation of particular priority levels associated with commands issued by a host computer to the data-storage system. In the following discussion, disk arrays and disk-array controllers are first described, as exemplary environments in which embodiments of the present invention may be implemented. Next, current two-level throttling techniques employed in certain disk-array controllers are described. Deficiencies in current disk-array-controller command-queue-fairness techniques are then described with respect to recent enhancements of host-computer-to-data-storage-system communications protocols that allow association of priorities with commands. Finally, embodiments of the present invention that eliminate or ameliorate these deficiencies are described.

Figure 1:
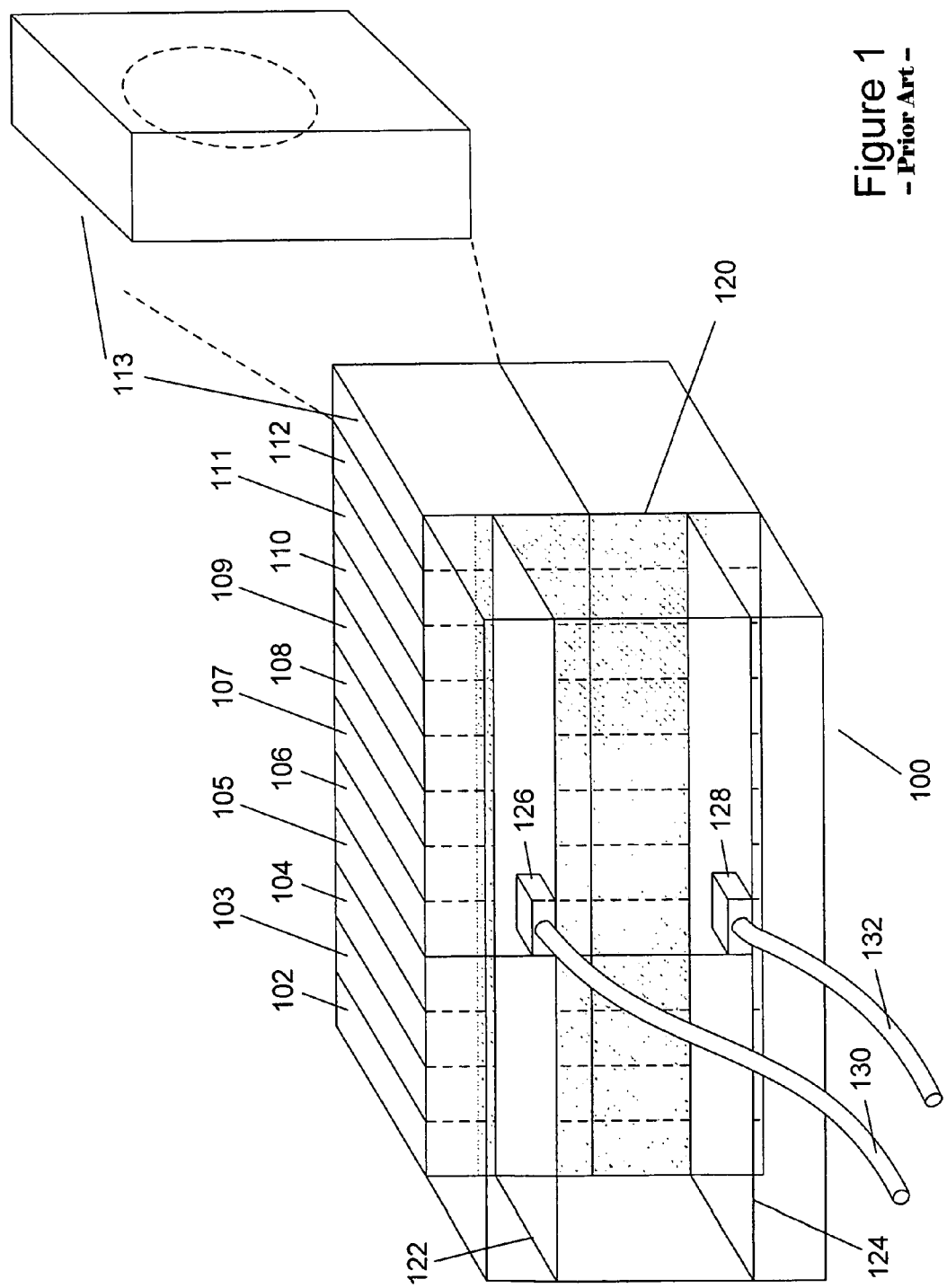
FIG. 1 illustrates an exemplary disk-array data-storage system.

FIG. 1 illustrates an exemplary disk-array data-storage system. A disk array 100 includes a large number of individual disk devices 102-113, each generally including multiple magnetic-disk platters, electromechanical READ/WRITE heads, and a disk controller. A disk device provides a virtual, logical-block-based command and data-exchange interface to physical data-storage blocks within the disk device. In the disk array 100, a large number of individual disk devices, such as disk device 113, are interconnected through a mid-plane 120 to multiple disk-array-controller boards 122 and 124, each including microprocessors and memory for executing disk-array controller programs that implement the logical-block interface. The disk-array controller boards generally provide a second-level, virtual, logical-unit-based and logical-block-based interface to accessing host computer systems via two or more communications-medium ports 126 and 128 that connect the disk-array controllers with two or more communications media 130 and 132. Disk arrays generally also include redundant power supplies, redundant cooling systems, redundant communications ports, and other such components. A disk array therefore provides a higher-level abstraction of an array of multiple disks to host computers and other accessing entities.

Many different currently-available disk arrays are based on a variety of disk-array architectures different from those shown in FIG. 1. For example, the disk-array controllers may reside in separate enclosures from the data-storage devices, and may be interconnected with the data-storage devices via electronic communications media, rather than through a backplane. Disk arrays may employ more than 2 disk-array controllers, may feature dual-ported data-storage devices with redundant linkage to multiple disk-array controllers, and provide high levels of availability and fault tolerance.

Figure 2:
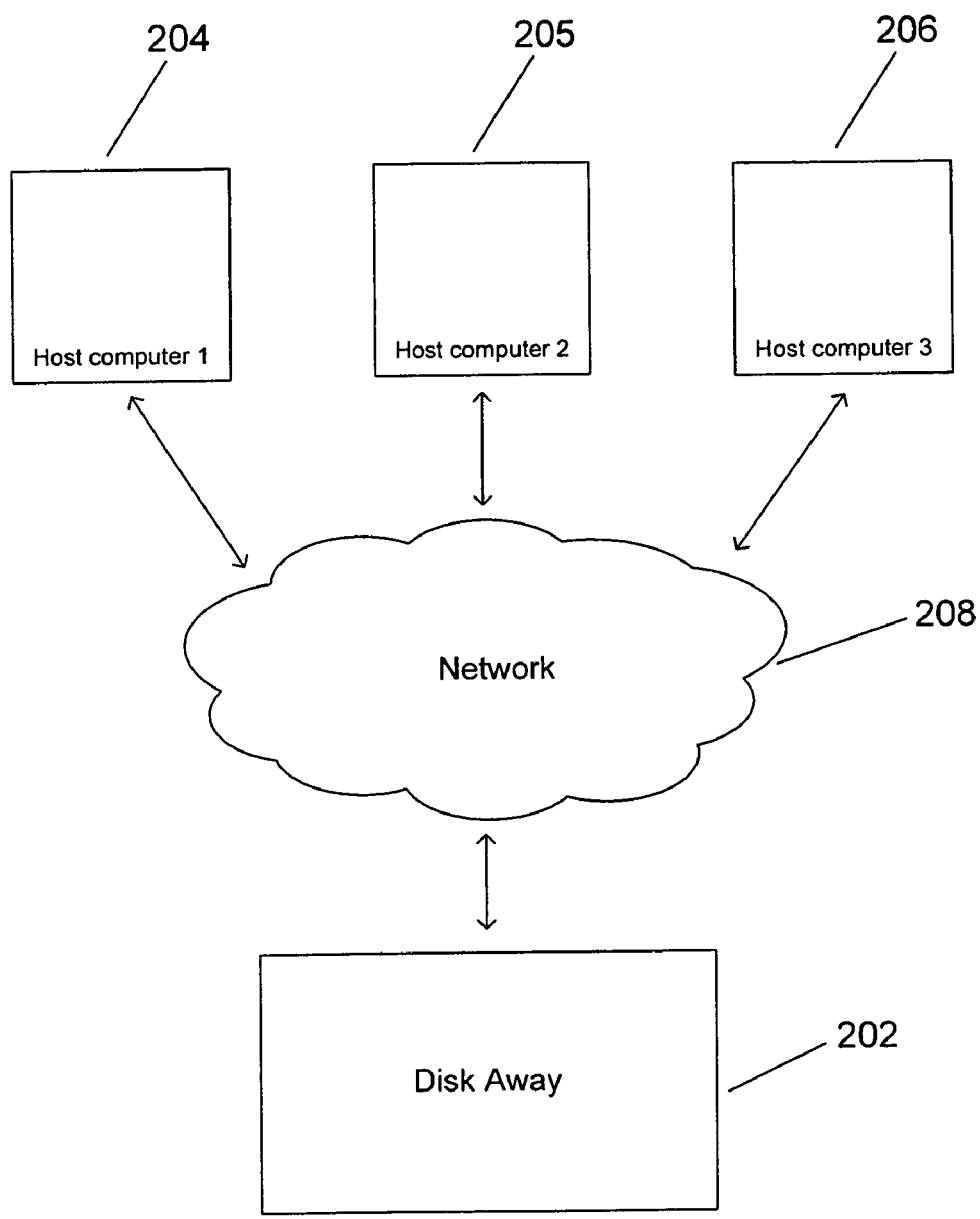
FIG. 2 illustrates interconnection of a disk array, such as the disk array illustrated in FIG. 1, with host computers.

FIG. 2 illustrates interconnection of a disk array, such as the disk array illustrated in FIG. 1, with host computers. As shown in FIG. 2, a disk-array data-storage system 202 may be interconnected with multiple host computers 204-206 via one or more electronic communications media 208. The electronics communications media may include one or more of a variety of different local-area networks, wide-area networks, and storage-area networks employing any of a large number of different host-computer-to-data-storage-device protocols and protocol stacks. A disk array basically provides a virtual, logical-unit-based and logical-block-based interface to each of the host computers, appearing to the host computers as a single, remote data-storage device that offers logical-block-based data-storage address spaces associated with one or more logical units. As discussed with reference to FIG. 1, the disk array internally manages translations from the virtual, logical-unit-based and logical-block-based interface, provided by the disk array to each host computer, and the logical-block-based data-storage-device interfaces provided by individual data-storage devices contained within, or associated with, the disk array.

Figure 3:
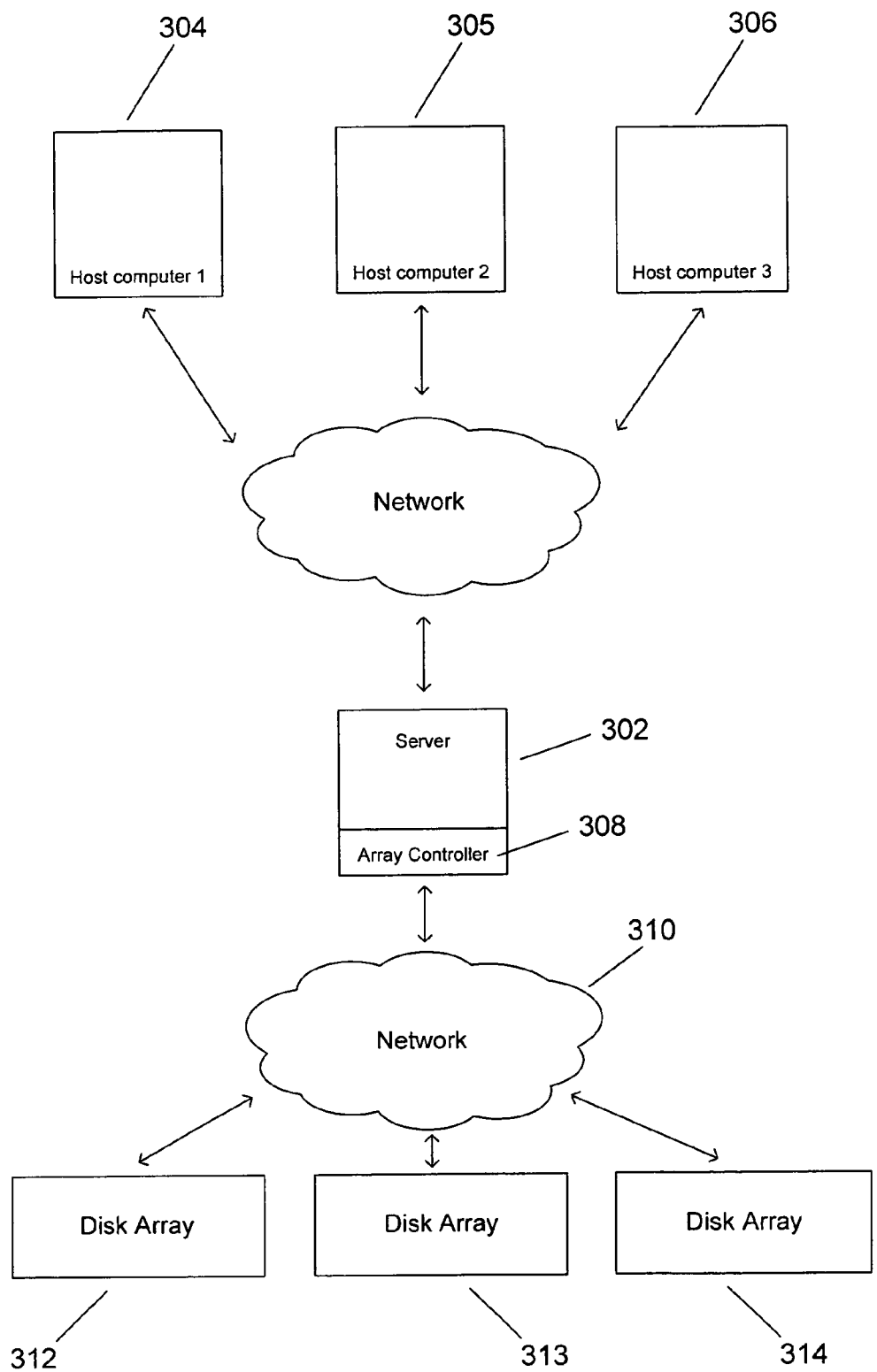
FIG. 3 illustrates connectivity of an array-controller-enhanced server to host computers and external data-storage systems.

FIG. 3 illustrates connectivity of an array-controller-enhanced server to host computers and external data-storage systems. As shown in FIG. 3, a server enhanced with an array controller 302 may be interconnected via one or more electronic communications media with multiple remote host computers 304-306 that exchange commands and data with the array-controller-enhanced server 302. The array controller 308 within the array-controller-enhanced server 302 may, in turn, be interconnected, through one or more electronic communications media 310, to multiple data-storage systems 312-314 that each includes internal data-storage devices. The array controller of the array-controller-enhanced server 302 provides a virtual interface to the multiple disk-array data-storage systems 312-314, just as a disk-array controller provides a virtual interface to multiple internal data-storage devices. Embodiments of the present invention may be implemented in a traditional disk-array controller, described with reference to FIG. 1, or in an array controller associated with a server, such as array controller 308 associated with array-controller-enhanced server 302 in FIG. 3. In both cases, the array controller or disk-array controller receives commands and data through a first interface, distributes the received commands and data, through a second interface, to internal data-storage devices and/or remote data-storage-systems for execution, receives responses and data from the internal data-storage devices and/or remote data-storage-systems through the second interface, and returns the responses and data to host computers through the first interface.

Figure 4:
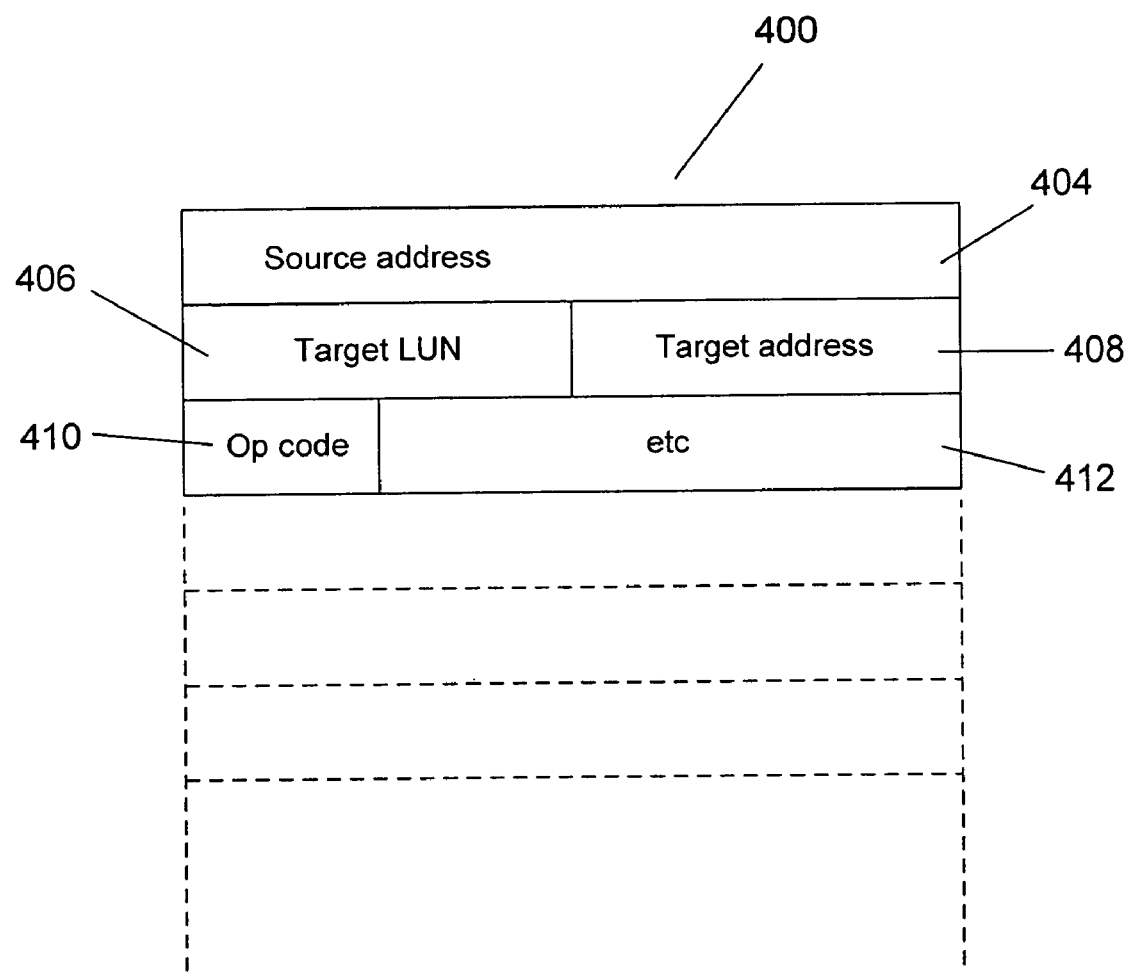
FIG. 4 illustrates an exemplary command encoded as a communications-protocol message that may be received by an array controller or disk-array controller.

FIG. 4 illustrates an exemplary command encoded as a communications-protocol message that may be received by an array controller or disk-array controller. Note that, in the subsequent discussion, the term "array controller" is used to mean both an array controller within an array-controller-enhanced server as well as a disk-array controller within a traditional disk-array data-storage device. A command message generally includes the address of the command source, typically a host computer 404, a target logical unit 406 and target logical-block address 408 for the command, an op code 410 that specifies the operation requested by the command, such as READ, WRITE, or various management operations, and additional fields 412 that describe various command-specific parameters and characteristics, such a the length, in blocks, of a READ or WRITE operation, as well as additional information needed for execution of the command by the receiving array controller and for receiving and returning data associated with execution of the command, status information, and other such information to the command source.

Figure 5:
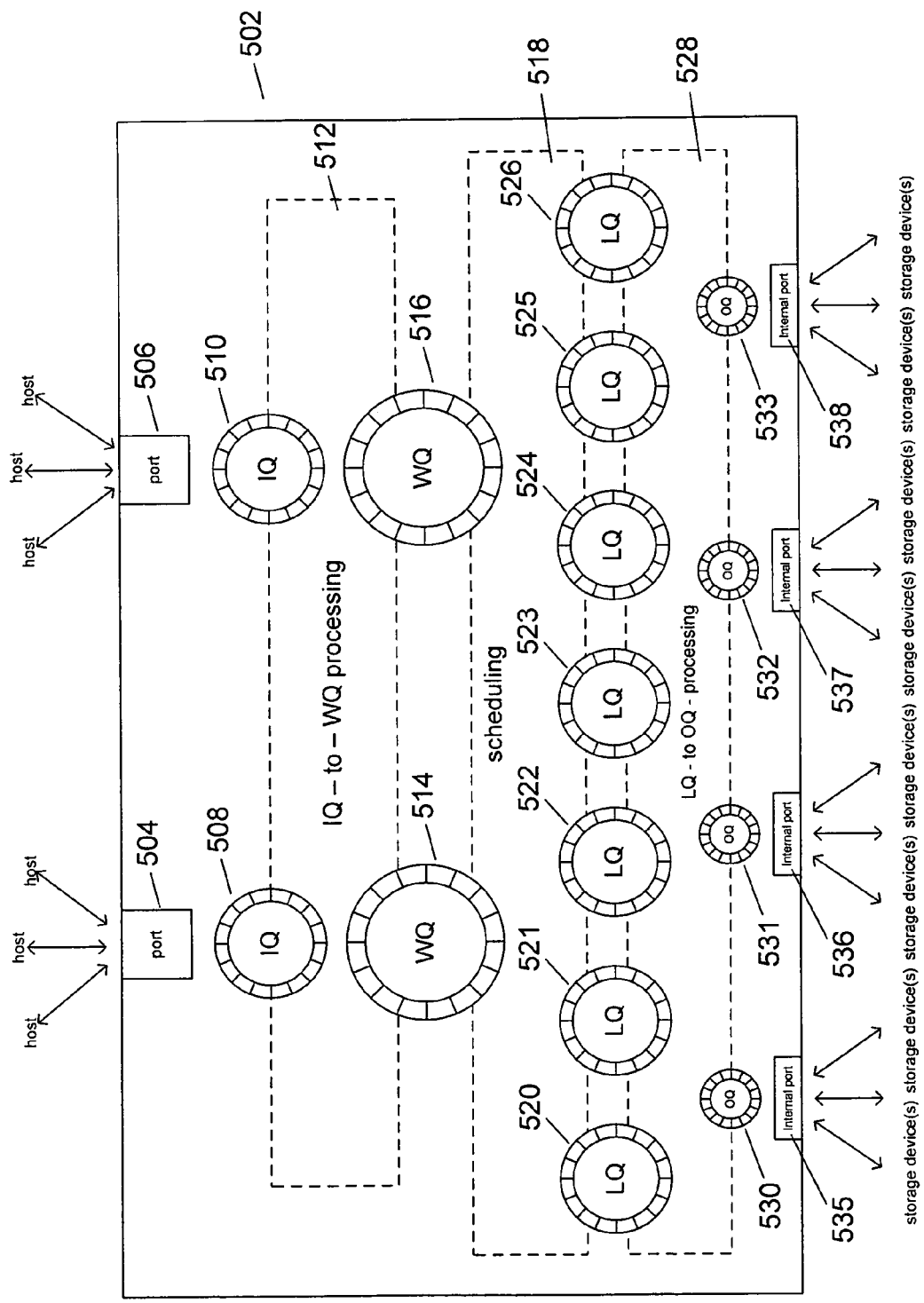
FIG. 5 illustrates exemplary queue data structures and management logic within an array controller for receiving commands from host computers through one or more electronics communications media and distributing the commands to internal targets, including internal data-storage devices and remote data-storage systems.

FIG. 5 illustrates exemplary queue data structures and management logic within an array controller for receiving commands from host computers through one or more electronics communications media and distributing the commands to internal data-storage targets, including internal data-storage devices and remote data-storage systems. As shown in FIG. 5, the array controller 502 includes multiple ports 504 and 506 through which the array controller communicates with multiple host computers. In the example array controller shown in FIG. 5, two ports 504 and 506 are shown, and an array controller may typically include two, four, eight, or more ports through which the array controller communicates with external host computers. Commands received through a port from host computers are generally queued to an input queue ("IQ") 508 and 510. An IQ-to-WQ processing logic 512 within the array controller generally dequeues commands from the IQs and queues the dequeued commands to working queues ("WQs") 514 and 516. The IQ-to-WQ processing logic generally includes throttling mechanisms to prevent command overload, as represented by overload of the WQs 514 and 516 and to ensure fair processing of commands from all external host computers accessing the array controller, as discussed in greater detail below. In the described embodiments, queuing of a ready command to a port-associated WQ commits array-controller command-processing resources to command execution. Next, scheduling logic 518 within the array controller dequeues commands from the WQs and distributes the commands to each logical unit supported by the array controller by queuing the commands to individual logic-unit-input queues ("LQs") 520-526. Finally, LQ-to-OQ processing logic 528 within the array controller dequeues commands from LQs and places the commands on output queues 530-533 associated with electronic-communications-media ports 535-538, respectively, in order to transmit the commands to target internal data-storage devices or target remote data-storage systems.

The queues and management logic shown in FIG. 5 are intended only as a general illustration of an array controller, and do not necessarily reflect the organization and structure of any particular array controller. In certain modern array controllers, various queue-layers shown in FIG. 5 may be replaced, for example, all or in part by high-throughput crossbar switches. In many cases, the logic layers shown in FIG. 5 are incorporated into a smaller number of logic modules. Many different organizations and partitioning of logic are possible. In many array-controller implementations, the multiple, port-associated WQs shown in FIG. 5 may be implemented as a single, shared WQ, or may, alternatively, be implemented in logic, with commands directly queued to LQs or LQ equivalents. While command-reception throttling, discussed below, is concentrated in the IQ-to-WQ processing logic (512 in FIG. 5) in the described array controllers, command-reception throttling may alternatively be carried out in the scheduling logic (518 in FIG. 5) or in other logic modules. However, the general illustration serves to illustrate the general position, within array-controller logic, inhabited by priority-level throttling methods that represent embodiments of the present invention.

Figure 6:
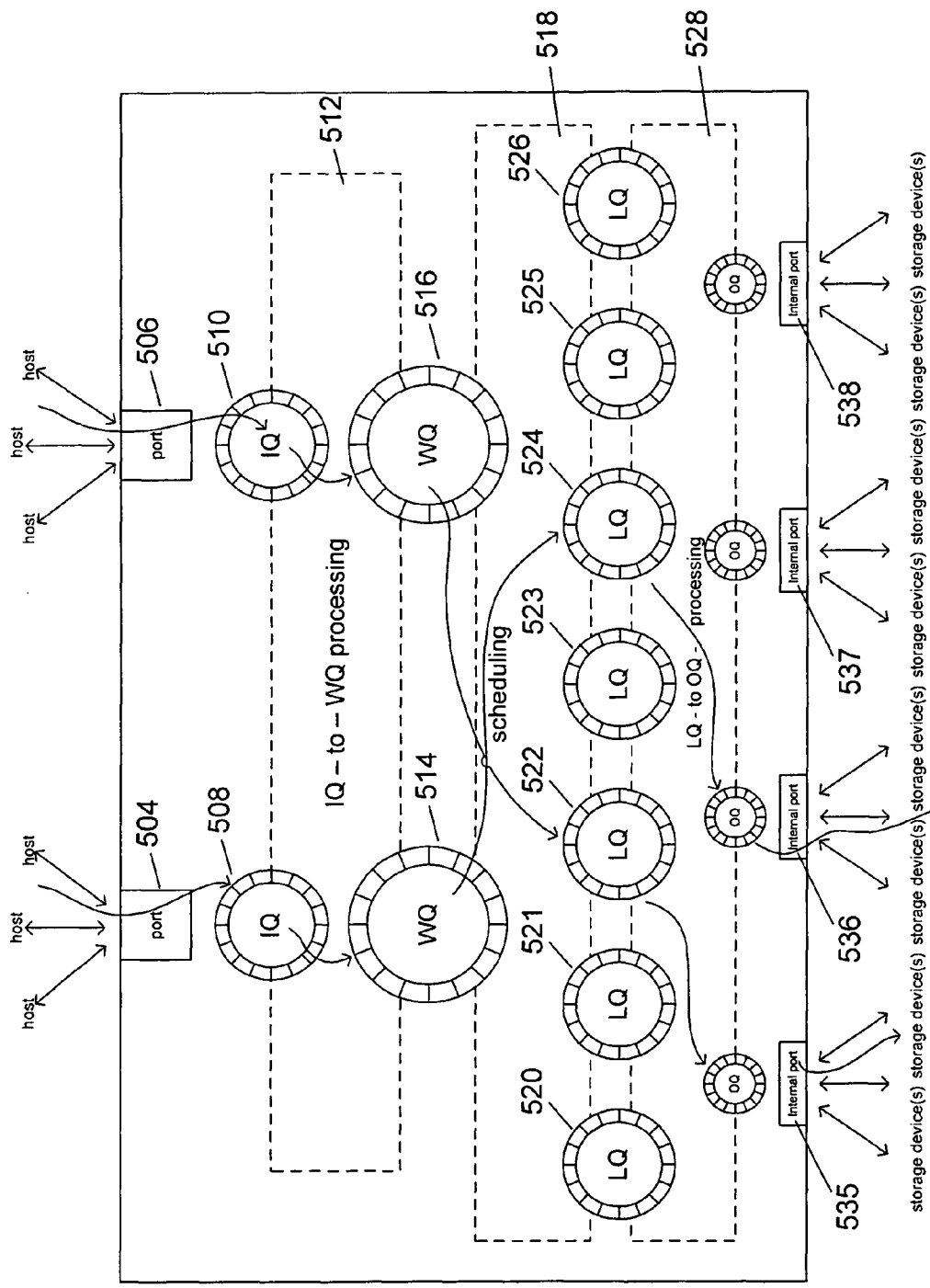
FIG. 6 illustrates the flow of commands through the array-controller data structures and management logic illustrated in FIG. 5.

FIG. 6 illustrates the flow of commands through the array-controller data structures and management logic illustrated in FIG. 5. As shown in FIG. 6, two commands can be simultaneously received by the array controller via ports 504 and 506. The two commands are input to the two IQs 508 and 510. A separate IQ is associated with each port. A separate WQ 514 and 516 is also associated with each port. The IQ-to-WQ processing logic 512 removes commands from the IQs and queues the commands to the WQs, depending on current workload and other factors. The IQ-to-WQ processing logic may choose to refuse commands by directing a command-refusal, or busy, response to be sent by the port, rather than queuing the commands dequeued from the IQs to the WQs, when the rate of command reception exceeds command-processing bandwidth of the data-storage system. The scheduling logic 518 employs various scheduling algorithms to dequeue commands from the WQs and place the commands onto individual LQs 520-526. The scheduler may take into account individual target data-storage-device and target data-storage-system capabilities and bandwidths, command reordering and batching in order to take best advantage of particular target-data-storage-device and target-data-storage-system characteristics and capabilities, and may consider additional considerations in choosing which commands to remove from the WQs and queue to the LQs at a given point in time. Note that, while a port is associated with a single IQ and WQ, commands may be transferred from a given WQ to any of the LQs. Thus, the scheduling logic 518 serves as a logical crossbar switch between the WQs and the LQs. The LQ-to-OQ processing logic 528 similarly serves as a crossbar switch between the LQs and individual OQs, and matches the rate of commands queued to the OQs to the command-processing capacities of the target data-storage devices and target data-storage systems. An array controller generally includes similar layers of queues and management logic for transferring responses and data received from target data-storage devices and target data-storage systems through the ports 535-538 back through the array controller to the ports 504 and 506, through which the responses and data are transferred to the host computers from which the commands, which elicited the responses and data, were originally received. Because embodiments of the present invention are directed to command reception and distribution by an array controller, the reverse paths, data structures, and logic layers involved in routing responses and data from target data-storage devices and target data-storage systems back to host computers are not illustrated and further discussed.

Figure 7A:
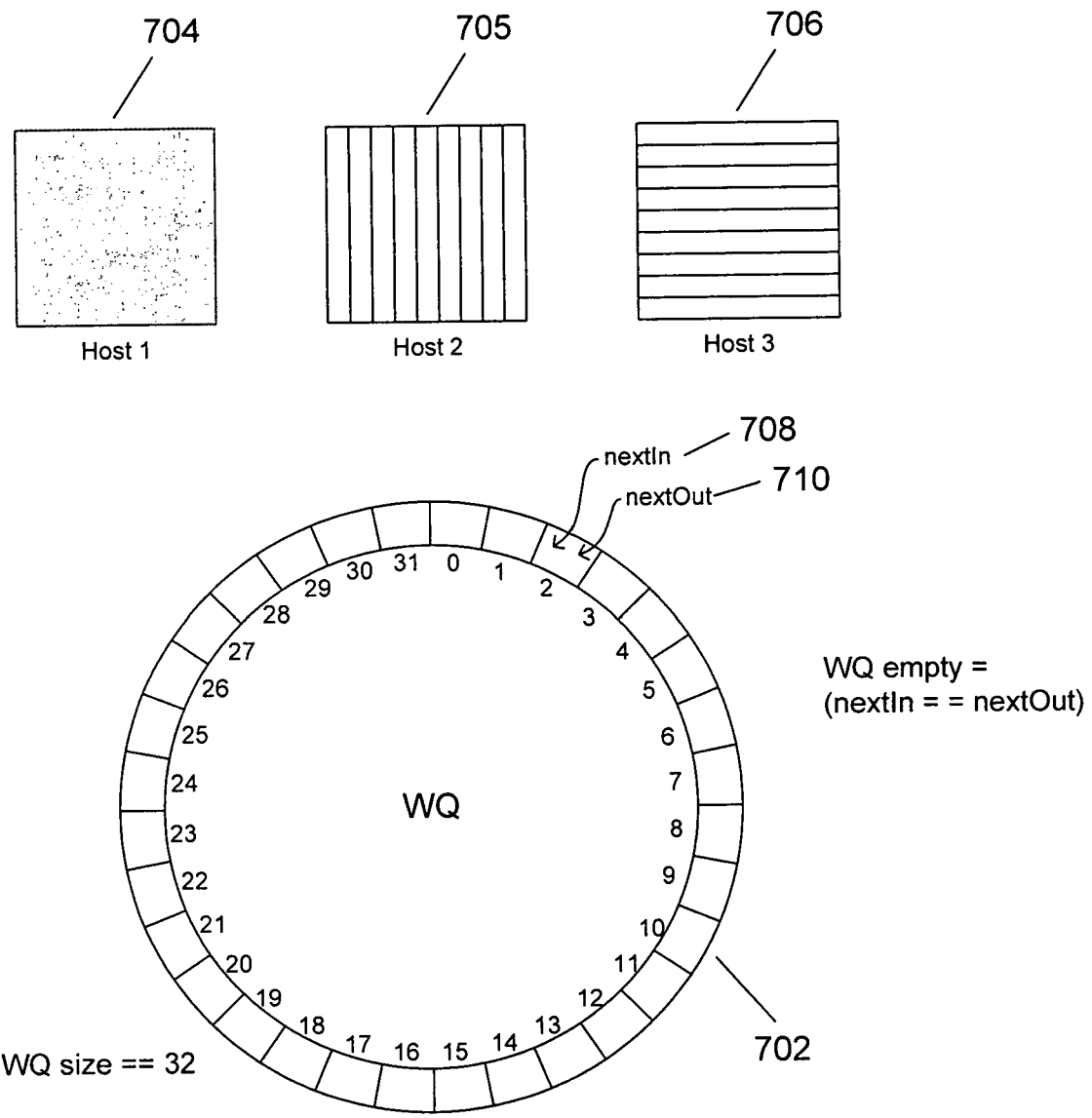
FIGS. 7A-E illustrate operation of a work queue (518 and 516 in FIG. 5).

FIGS. 7A-E illustrate operation of a work queue (518 and 516 in FIG. 5). In FIGS. 5 and 6, all of the queues are shown as circular queues. FIGS. 7A-E illustrate operation of a circular WQ as well as certain common queue conditions that may arise. In FIGS. 7A-E, and in subsequent figures, the WQ 702 is shown as a circular queue with 32 entries. In actual array-controller implementations, WQs may have hundreds or thousands of entries, and may be variably sized. In FIG. 7A, queue entries associated with three host computers 704-706 are shown using shading, vertical cross-hatching, and horizontal cross-hatching, respectively. In FIG. 7A, the WQ 702 is empty. A circular queue is associated with two pointers: (1) nextIn 708, referencing the queue entry into which a next received command can be queued; and (2) nextOut 710, a pointer referencing the queue entry containing a command to next be dequeued from the queue. When nextIn equals nextOut, the queue is empty, expressed in a C++-like assignment as:

$$WQempty=(nextIn==nextOut)$$

The exemplary queues shown in FIG. 7A-E and in later figures have sizes of 32 entries:

$$WQsize==32$$

Figure 7B:
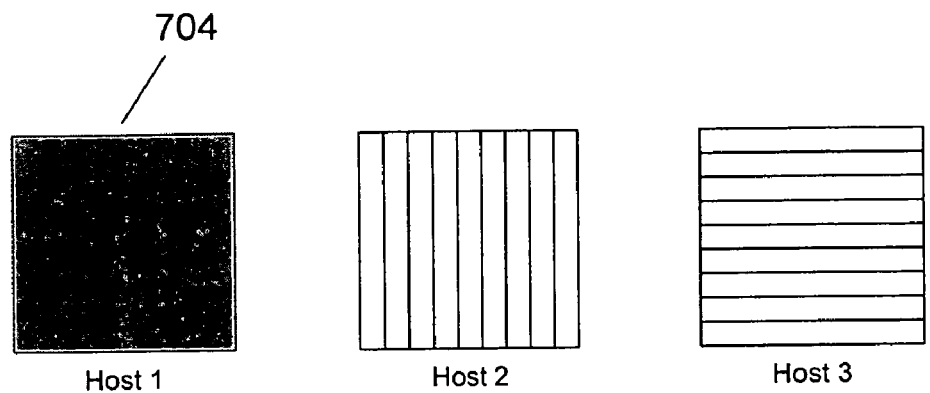
Figure 7B:
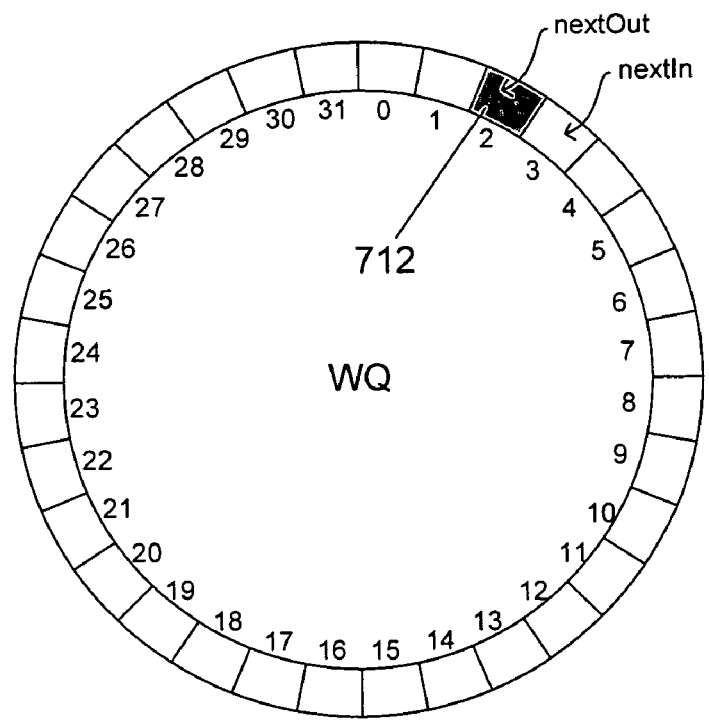
Figure 7C:
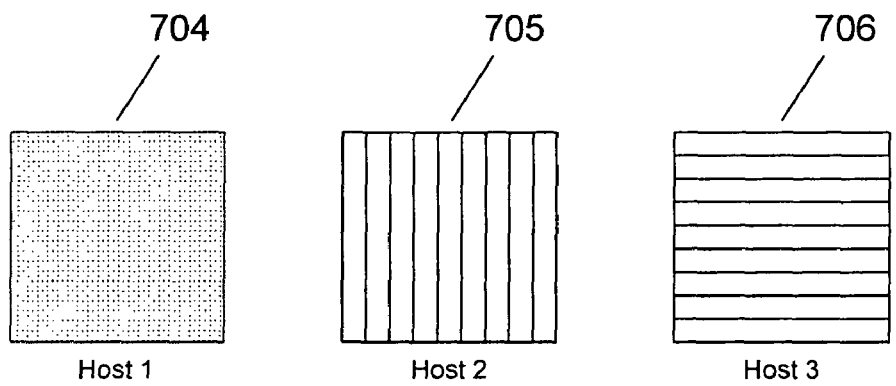
Figure 7C:
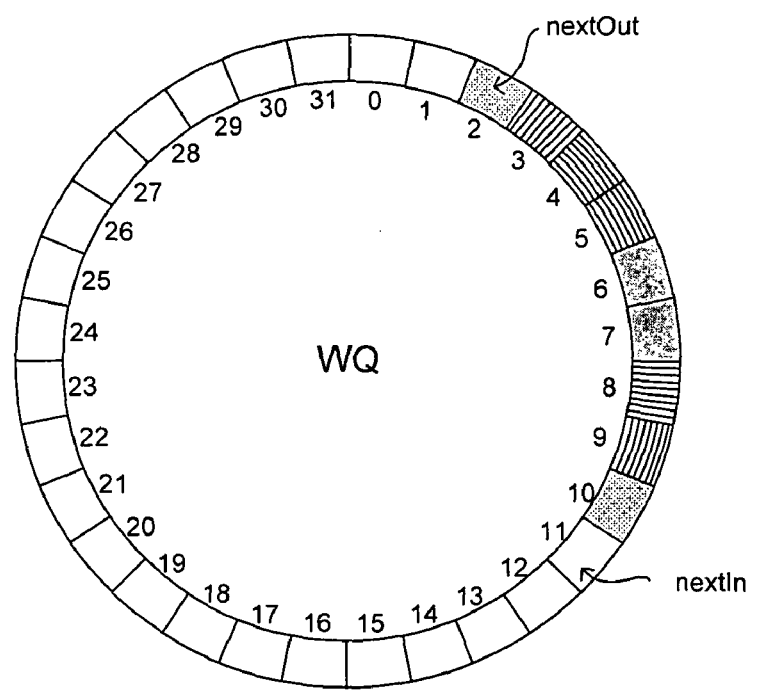

As shown in FIG. 7B, when a command is entered into the queue, the nextIn pointer is advanced by one entry. In FIG. 7B, a command 712, indicated by shading to have been received from the first host 704, has been entered into entry 2 of the circular WQ. FIG. 7C shows the circular WQ of FIGS. 7A-B following entry of eight additional commands from all three host computers 704-706. The source of the entries is again indicated by shading and cross-hatching within the circular queue. The current queue depth, WQdepth, can be determined as:

$$WQ\text{depth}=(\text{nextIn}-\text{nextOut}+32)\text{MOD }32$$

Figure 7D:
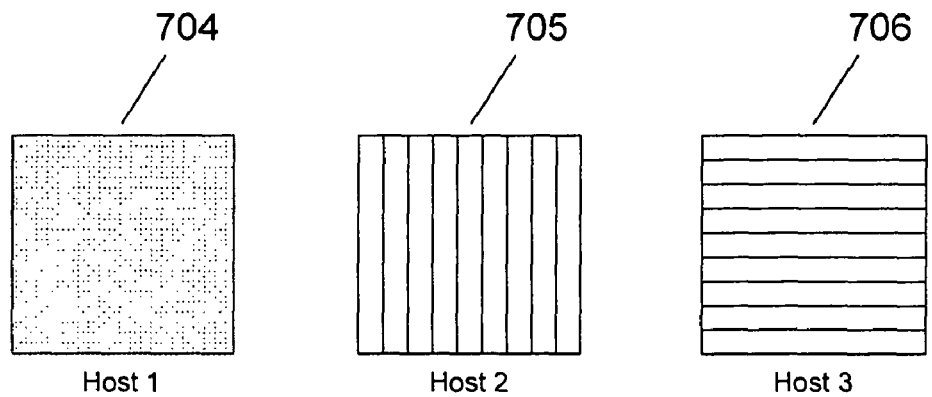
Figure 7D:
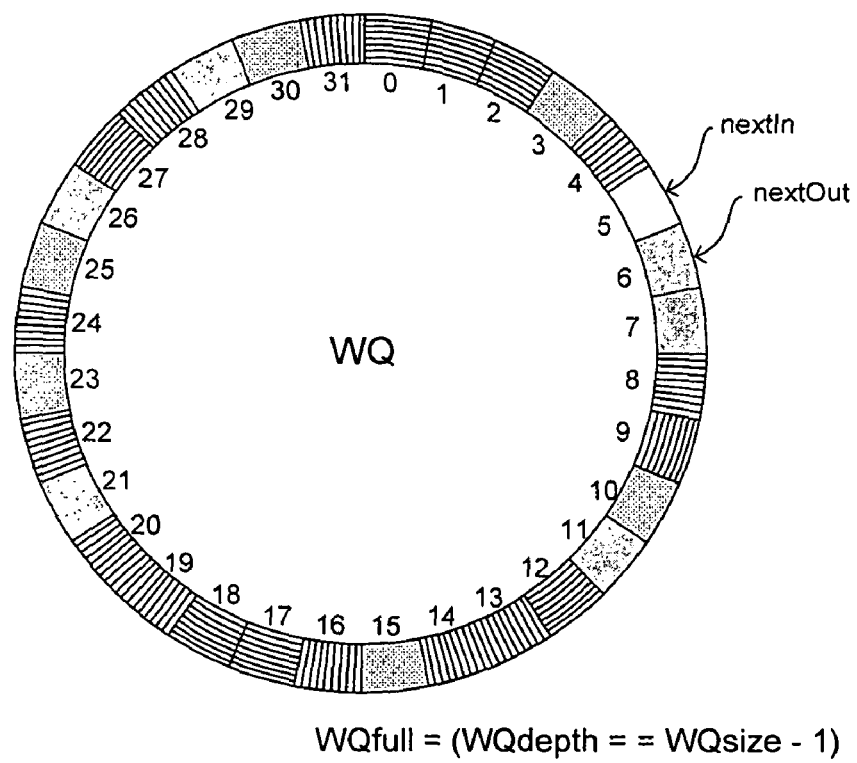

FIG. 7D shows the WQ of FIGS. 7A-C following removal of four entries from, and addition of 26 entries to, the WQ as shown in FIG. 7C. The WQ shown in FIG. 7D is full. Note that, when the WQ is full, one entry, namely the entry referenced by pointer nextIn, is empty. The WQfull condition is determined as:

$$WQ\text{full}=(WQ\text{depth}==WQ\text{size}-1)$$

In general, the IQ-to-WQ processing logic of an array controller 512 cannot allow the WQ to be completely filled. When the WQ is completely filled, the array controller has no additional capacity for accepting commands from the port associated with the WQ. Therefore, as described below, the array controller generally associates a MAX WQdepth parameter with each WQ to indicate the maximum depth that a WQ is allowed to attain before the array controller invokes throttling mechanisms to decrease the rate of command reception through the port associated with the WQ. In FIG. 7D, the WQ is full, but each of the three host computers 704-706 are fairly represented by commands within the WQ. In other words, there are equivalent numbers of commands in the WQ that have been received from each of the three host computers, indicating that all host computers enjoy access to some reasonable portion of overall command-processing bandwidth provided by the array controller through the port. In this case, a general command-reception throttling may be undertaken by the array controller to decrease the rate at which commands are received by the array controller, on a port-by-port basis, without regard to the host computers from which the commands are received.

Figure 7E:
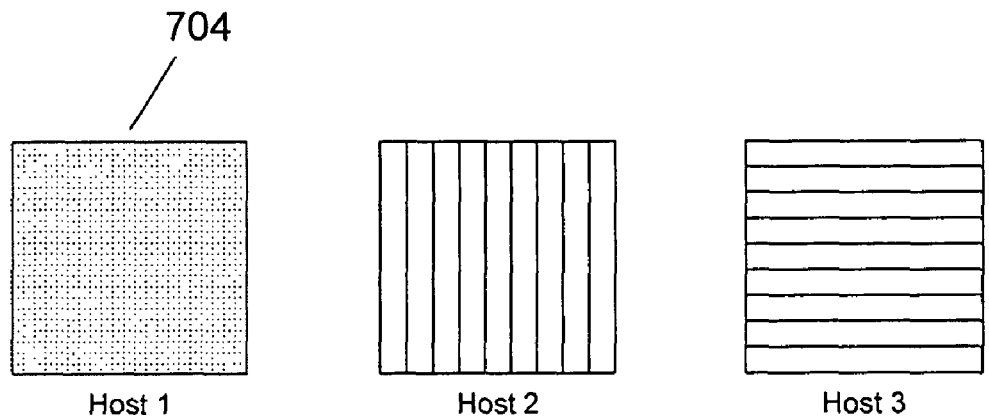
Figure 7E:
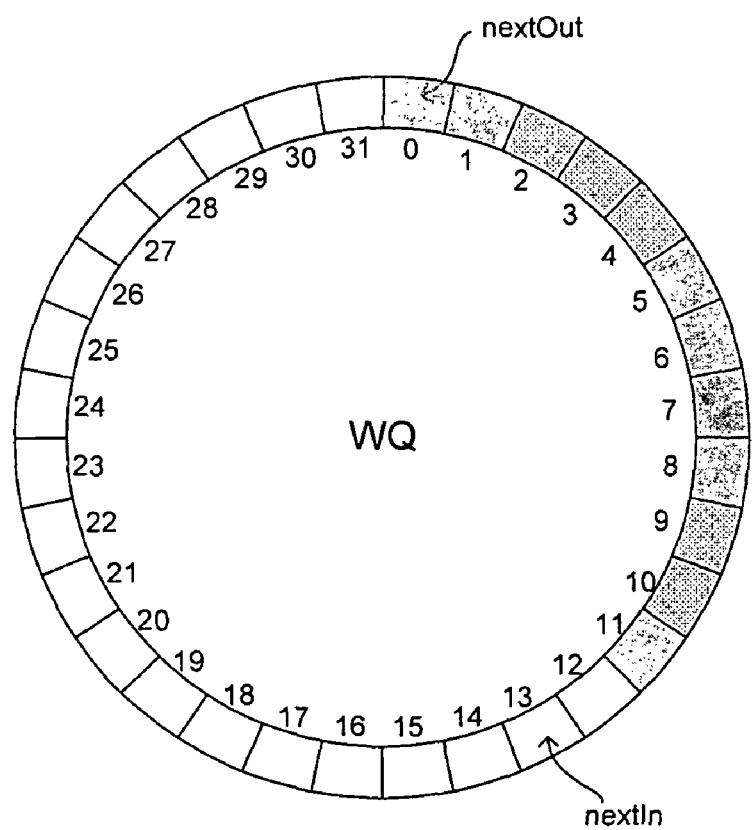

FIG. 7E illustrates a different, undesirable WQ state from that shown in FIG. 7D. In FIG. 7E, the WQ is not even half-filled. However, all entries in the WQ are seen to have been received from the first host computer 704, and it is assumed, for this example, that the other host computers are attempting to issue commands to the array controller through the port associated with the WQ. Thus, while the total overall capacity for command processing through the port associated with the WQ is not being used, all of the bandwidth for command processing through the port is being used by the first host computer, and the remaining host computers are starved. In general, an array controller uses a second throttling mechanism to ensure that all host computers have fair access to at least a minimum fraction of the array-controller bandwidth represented by the WQ.

Figure 8A:
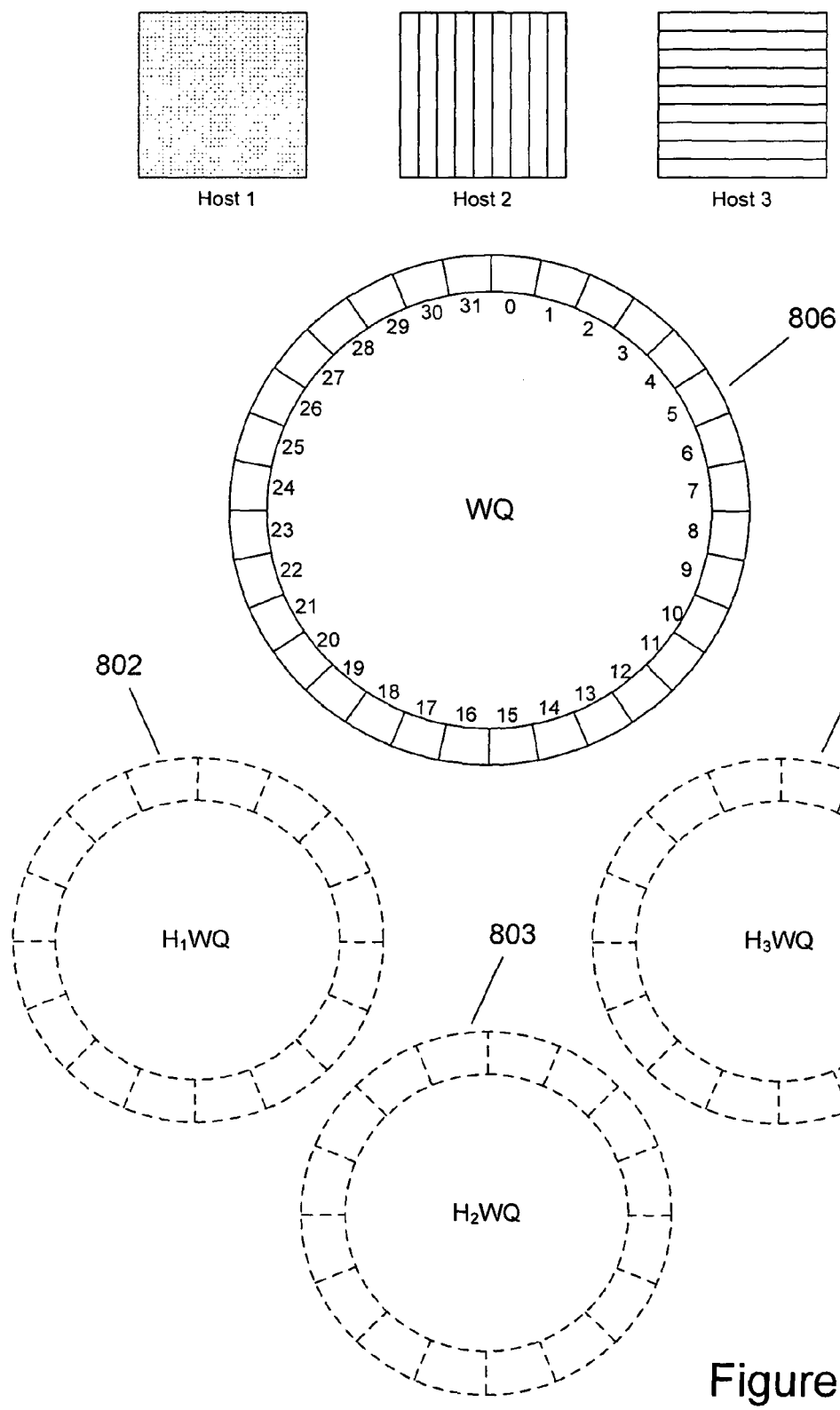
FIGS. 8A-D illustrate throttling mechanisms used by currently available array controllers in order to prevent general command overload, as represented by a work queue containing more entries than a threshold number of entries, and to prevent host-computer-specific command overload.

FIGS. 8A-D illustrate throttling mechanisms used by currently available array controllers in order to prevent general command overload, as represented by a work queue containing more entries than a threshold number of entries, and to prevent host-computer-specific command overload. FIGS. 8A-D use the same illustration conventions as used in FIGS. 7A-E. As shown in FIG. 8A, a new set of logical, or virtual, host-specific WQs 802-804 can be considered to be associated with the WQ 806. The host-specific WQs 802-804 are not actually separately allocated and maintained, but instead describe how the IQ-to-WQ processing logic (512 in FIG. 5) considers the WQ with respect to the host computers accessing the array controller through the port associated with the WQ. The three virtual host-specific WQs 802-804 have variable sizes that may be altered, under certain conditions, by the IQ-to-WQ processing logic.

Figure 8B:
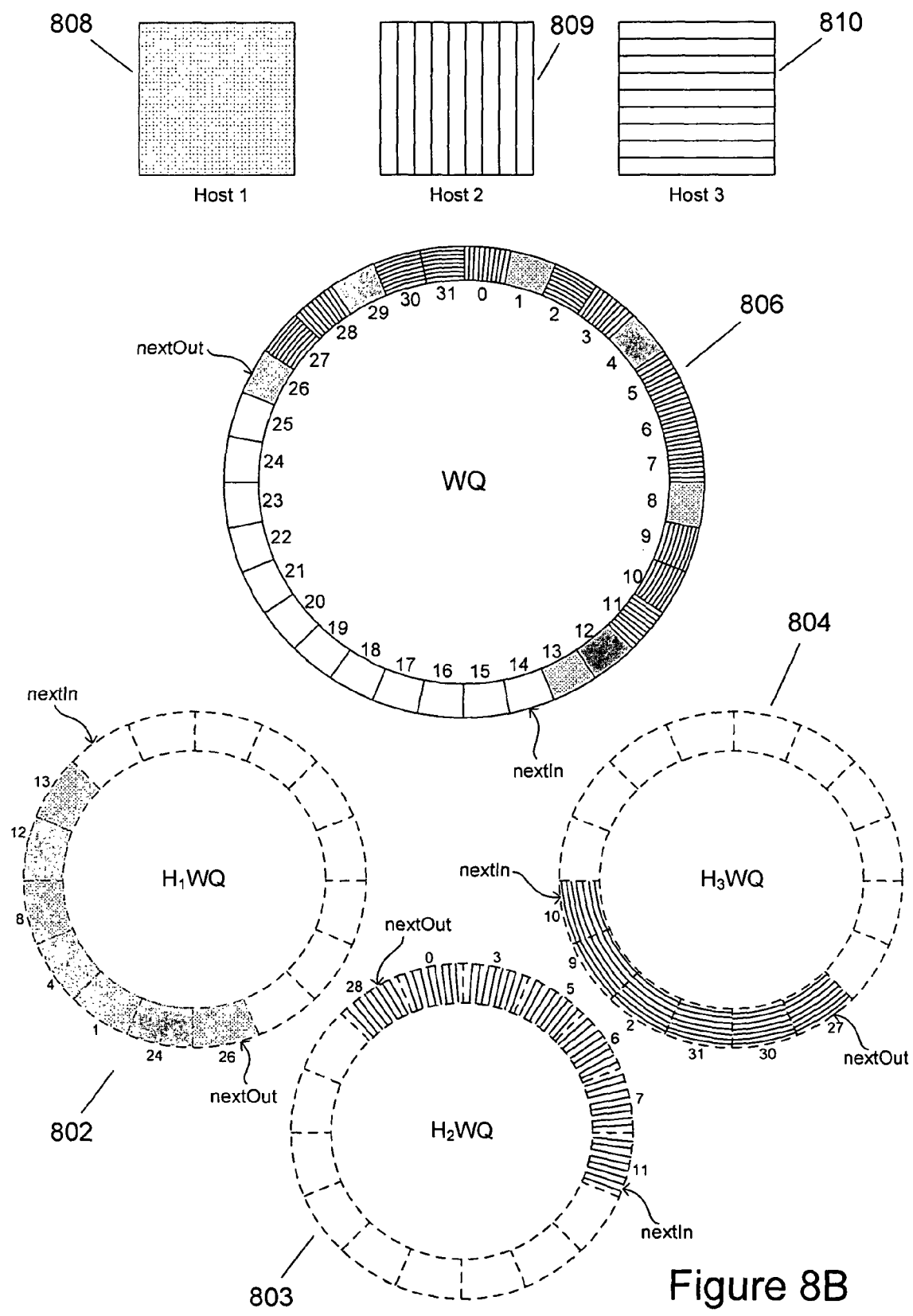

FIG. 8B illustrates the WQ and host-specific queues shown in FIG. 8A containing commands received from the three, accessing host computers. As shown in FIG. 8B, the WQ 806 contains 20 commands received from the three host computers 808-810. The IQ-to-WQ processing logic 512 views the contents of the WQ as being partitioned among the three host-specific WQs 802-804. Thus, for example, the commands and WQ entries 26, 29, 1, 4, 8, 12, and 13 are shown in host-specific WQ $H_1$WQ 802 as contiguous entries.

Figure 8C:
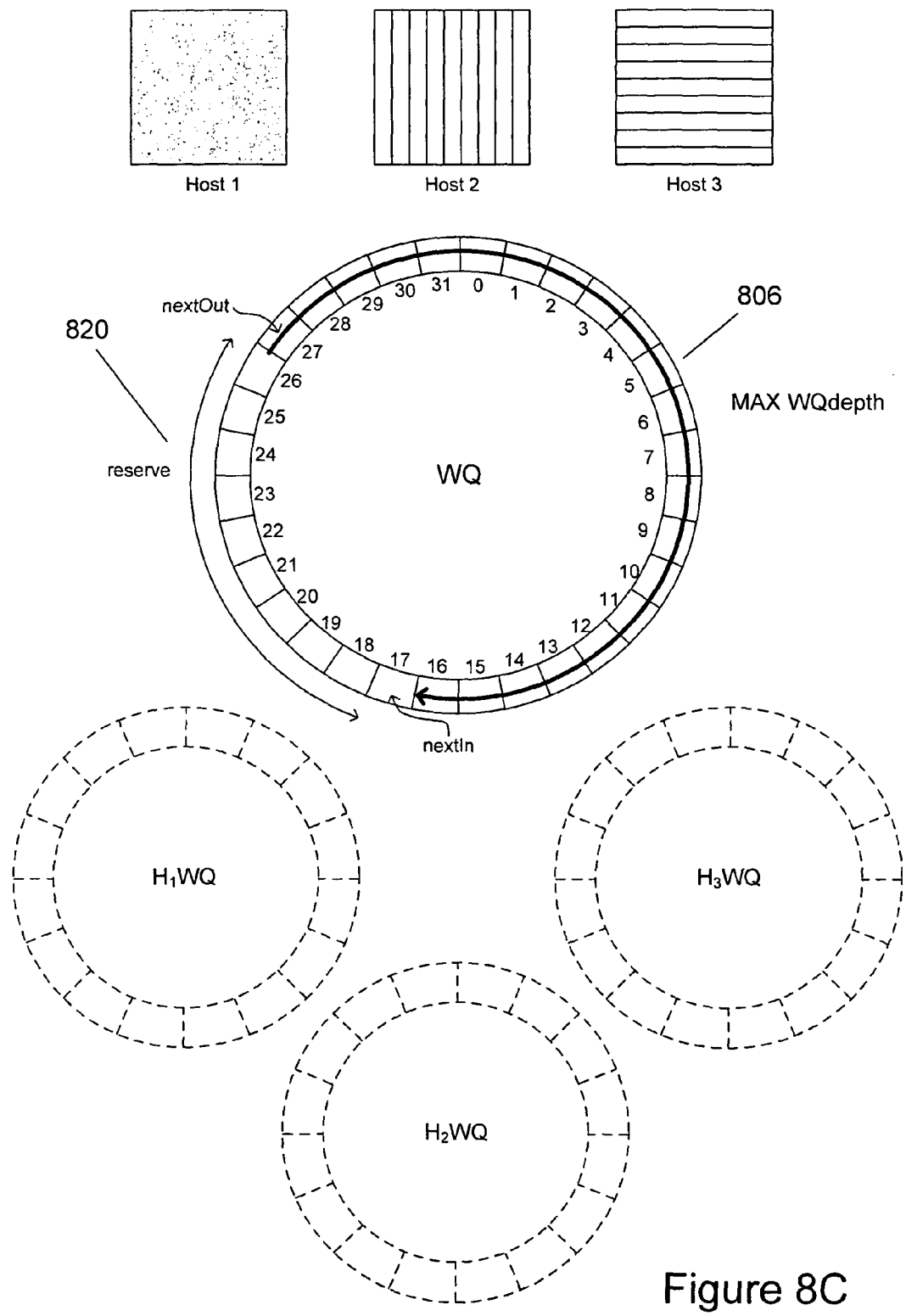
Figure 8D:
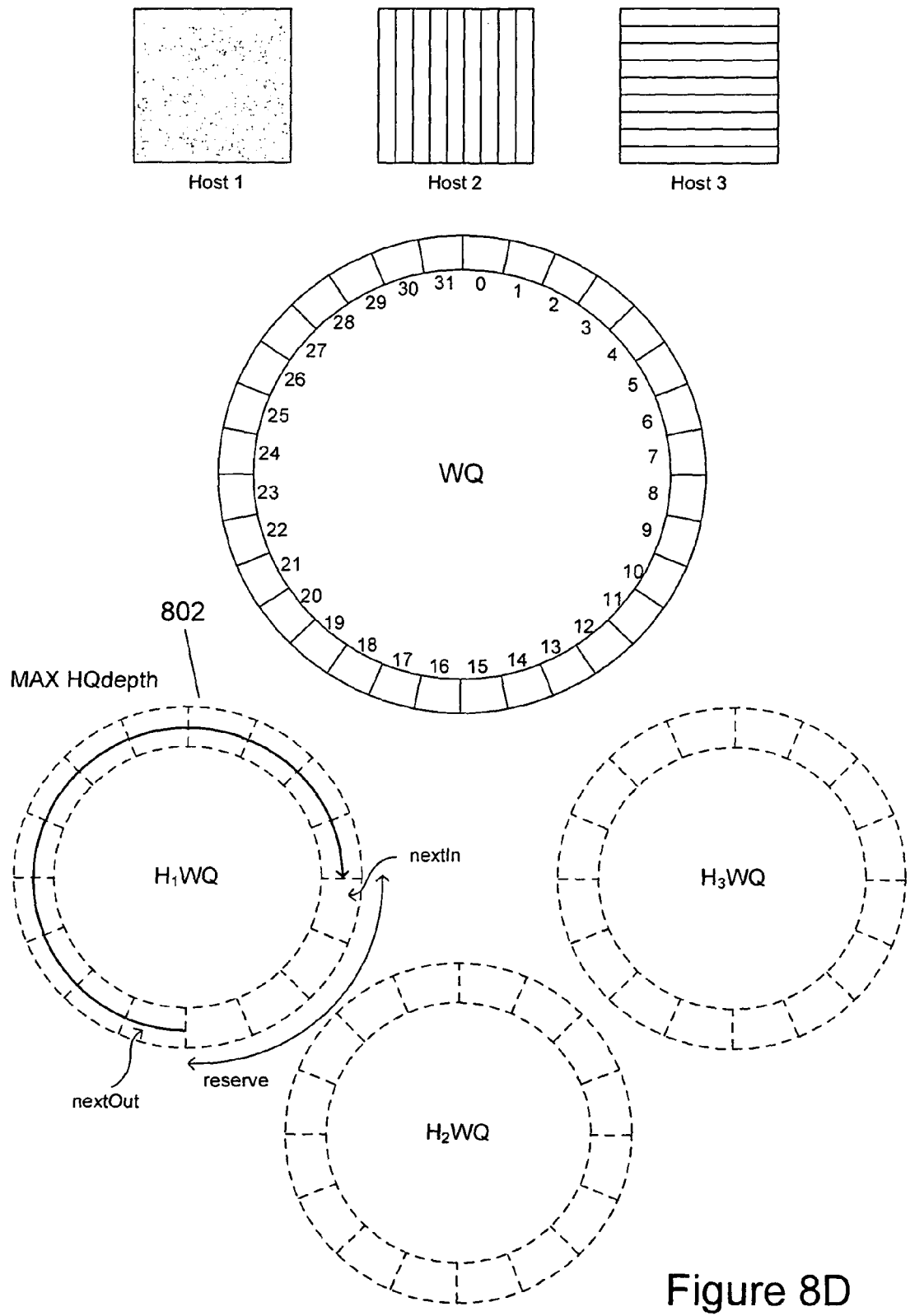

FIG. 8C illustrates a first throttling parameter used by the IQ-to-WQ processing logic (512 in FIG. 5) in order to control the rate of command reception by the array controller on a per-port basis. As shown in FIG. 8C, the WQ is associated with a MAX WQdepth parameter that specifies the maximum number of queue entries allowed in the WQ before throttling is undertaken. In FIG. 8C, the WQ 806 is shown containing a number of entries equal to MAX WQdepth, where MAX WQdepth is 21. Of course, the numerical value of MAX WQdepth varies with the particular array-controller implementation, data-storage-system configuration, WQ size, and other factors, and is generally determined as a percentage of the WQ entries, with the total number of WQ entries representing the command-processing resources available for the port associated with the WQ. The parameter MAX WQdepth essentially reserves a number of queue entries 820 to be able to gracefully handle overload conditions. FIG. 8D shows a second parameter used by the IQ-to-WQ processing logic (512 in FIG. 5) of an array controller. As shown in FIG. 8D with respect to host-specific WQ $H_i$WQ 802, each host-specific WQ is also associated with a maximum allowable depth MAX $HQ_i$depth. The MAX $HQ_i$depth parameter for each host-specific WQ $H_i$WQ essentially reserves a small number of virtual host-specific WQ entries to handle certain types of host-specific command-overload conditions. In actual array-controller implementations, additional parameters per-port associated with throttling may be maintained and considered by the disk-array controller, including the recent history of busy responses, or command-execution refusals, returned by the array controller to given host computers, continuous calculation of average host activity, current $H_i$WQ depths, and other such parameters and calculated values.

Figure 9:
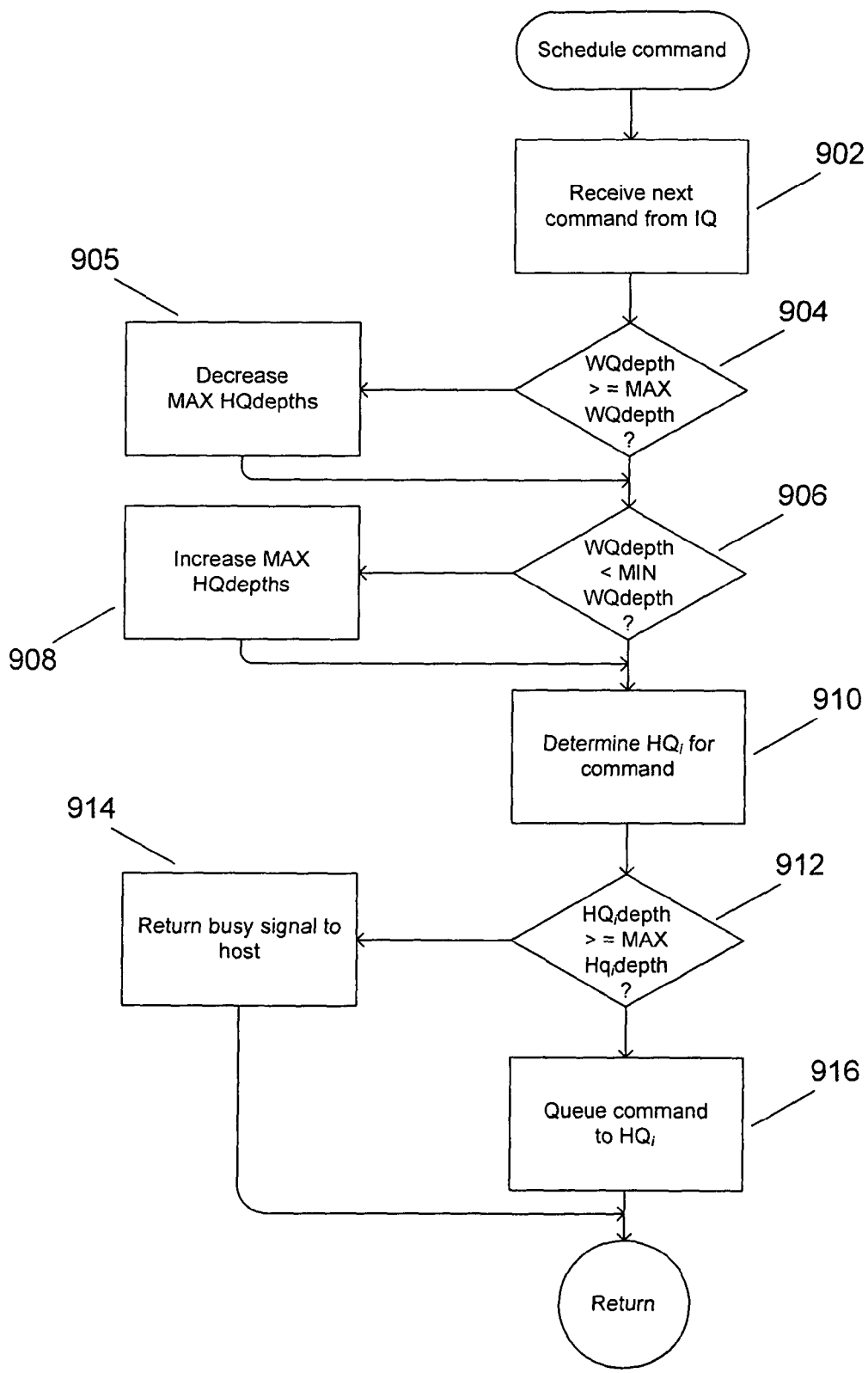
FIG. 9 is a control-flow diagram that describes the throttling mechanisms used by the IQ-to-WQ processing logic of certain, currently available array controllers to prevent command overload and host starvation on a per-port basis.

FIG. 9 is a control-flow diagram that describes the throttling mechanisms used by the IQ-to-WQ processing logic of certain, currently available array controllers to prevent command overload and host starvation on a per-port basis. In step 902, the routine "scheduleCommand," which represents IQ-to-WQ processing logic associated with moving commands from IQs to WQs, receives a next command from an IQ associated both with a particular port and particular WQ. If the WQdepth of the WQ associated with the IQ is greater than equal to MAX WQdepth, as determined in step 904, then the routine "scheduleCommand" decreases the specific MAX $H_i$WQdepth parameters of all or a portion of the host-specific virtual WQs in step 905. In essence, step 905 represents a first, non-host-specific throttling of command reception. In certain embodiments, if the MAX $H_i$WQdepth parameter for a particular host-specific WQ is decreased below the current depth of the host-specific WQ, the most recently queued commands are dequeued from the host-specific WQ and a response is returned to the host computer indicating that the array controller is too busy to handle the commands. In alternative embodiments, any commands in excess of the current MAX $H_i$WQdepth parameter for a host-specific WQ are allowed to remain on the queue, but subsequently received commands from the host are refused, with busy indications, until the host-specific WQdepth falls below MAX $H_i$WQdepth. Next, in step 906, the routine "scheduleCommand" determines whether WQdepth is less than a parameter MIN WQdepth for the WQ. If so, then in step 908, the routine "scheduleCommand" increases the MAX $H_i$WQdepth parameters of the virtual host-specific WQs associated with the WQ. Step 908 essentially reverses the throttling undertaken in step 905 when the rate of command reception falls below an overload condition. Of course, the increase of MAX $H_iWQdepth$ parameters is bounded, so that the routine "scheduleCommand" cannot increase these parameters above a particular limit. Similarly, the routine "scheduleCommand" cannot decrease the parameters MAX $H_iWQdepth$ in step 905 below some minimum value. In alternative embodiments, MAX $H_iWQdepth$ parameter throttling may be relaxed as a function of both time and decreased rate of command reception. The changes in MAX $H_iWQdepth$ parameters may be made on a per-$H_iWQ$ basis, and may reflect many additional considerations, including the recent history of busy responses, or command-execution refusals, sent by the array controller to the particular host via the port associated with the WQ, average host activities through the port associated with the WQ, and other such considerations. In general, the array controller endeavors to communicate and cooperate with host computers, so that host computers can intelligently modify command-transmission rates in order to maximize command-processing service received from the disk-array while minimizing busy responses from the array controller. Achieving desirable and stable rates of command processing may involve constant adjustments made both by host computers and array controllers. FIG. 9 is not intended to detail all of these considerations and adjustments, which may vary from implementation to implementation and from system to system, but instead to show the general levels of throttling undertaken by the array controller. Next, in step 910, the routine "scheduleCommand" determines the particular host-specific WQ, $H_iWQ$, for the received command. If the host-specific WQ depth is greater than or equal to MAX $HQ_idepth$, as determined in step 912, then the routine "scheduleCommand" returns the command with a busy indication to the host 914. Otherwise, in step 916, the routine "scheduleCommand" queues the command to the host-specific WQ, $H_iWQ$. Note that this queuing, carried out in step 916, actually amounts to queuing of the command to the WQ associated with the virtual WQ $H_iWQ$ and updating of both WQ and $H_iWQ$ pointers.

Figure 10:
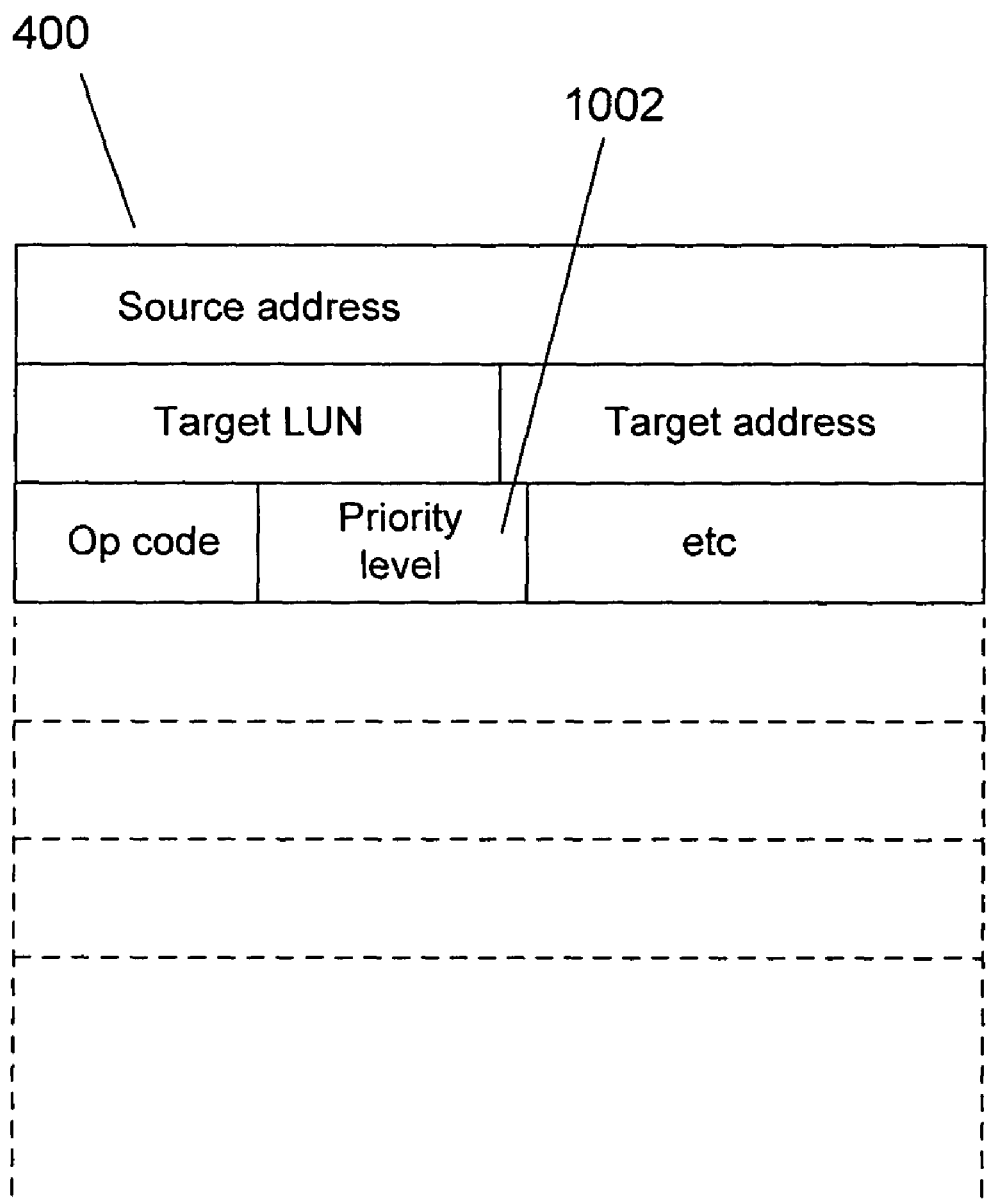
FIG. 10 illustrates inclusion of a priority level within a command.

Recently, certain communications protocols for host-computer-to-data-storage-system communications have been enhanced to include a command priority level associated with each command. FIG. 10 illustrates inclusion of a priority level within a command. FIG. 10 uses the same illustration conventions as used in FIG. 4. Note the addition of the field "priority level" 1002 within the previously described command 400. The priority level essentially partitions commands into command groups, each with a different priority. Command-associated priorities are intended to instruct an array controller as to which commands need to be executed with highest priority, and which commands, having lower priority, can be deferred execution in the interest of more timely execution of higher-priority commands.

Figure 11:
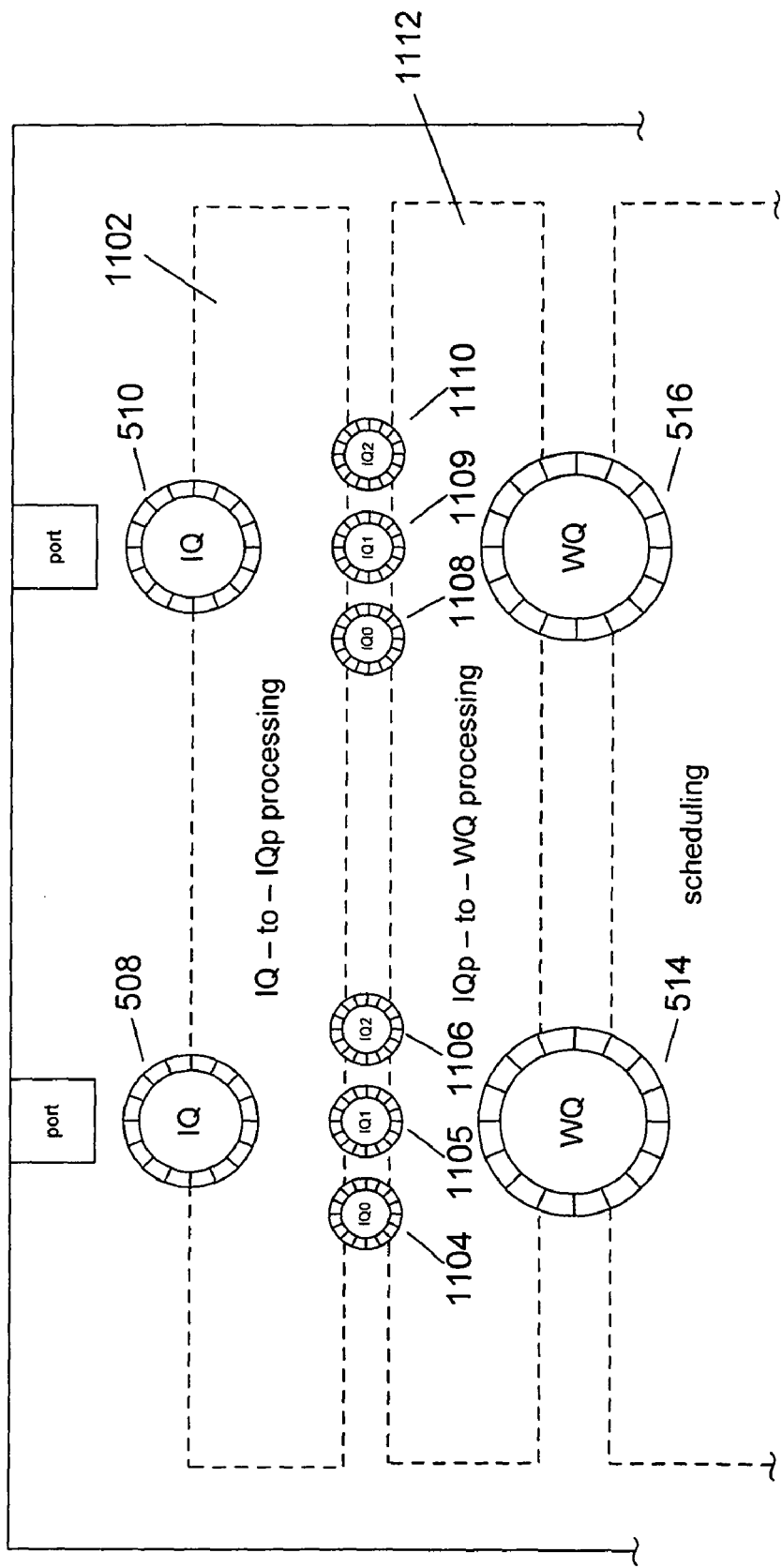
FIG. 11 illustrates, using the illustration conventions of FIGS. 5 and 6, addition of priority queues, interposed between each IQ and WQ, to an array controller.

FIG. 11 illustrates, using the illustration conventions of FIGS. 5 and 6, addition of priority queues, interposed between each IQ and WQ, to an array controller. As shown in FIG. 11, the addition of command priority levels entails splitting the IQ-to-WQ processing logic (512 in FIG. 5) into two new layers: (1) IQ-to-$IQ_p$ processing logic 1102, which dequeues commands from the IQs 508 and 510 and queues the commands to one of a series of priority queues 1104-1106 and 1108-1110 associated with each IQ and WQ; and (2) $IQ_p$-to-WQ processing logic 1112 which dequeues, according to priority, commands from the priority queues 1104-1106 and 1108-1110 and queues the commands to the WQs 514 and 516. The $IQ_p$-to-WQ processing logic 1112 preferentially dequeues commands from the highest-priority priority queues 1106 and 1110, and dequeues commands with decreasing preference from the second-highest-priority priority queues 1105 and 1109 down to the lowest-priority priority queues 1104 and 1108. Of course, an arbitrary number of priority queues may be associated with each IQ/WQ pair, depending on the number of priority levels supported by the host-computer-to-data-storage-system communications protocol.

Figure 12A:
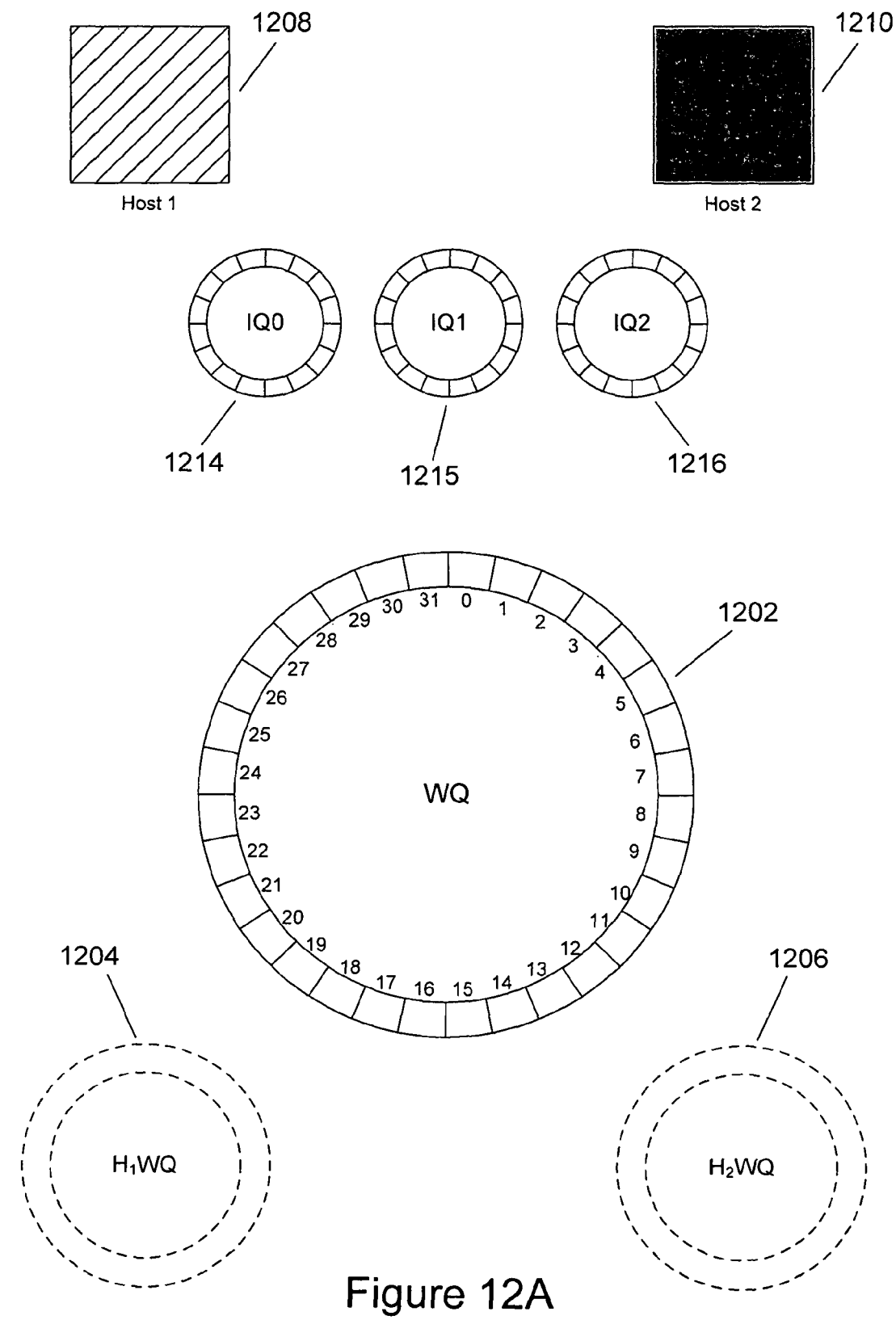
FIGS. 12A-B illustrate an example of numerous different types of priority-level starvation that may occur as a result of introduction of command-associated priorities.
Figure 12B:
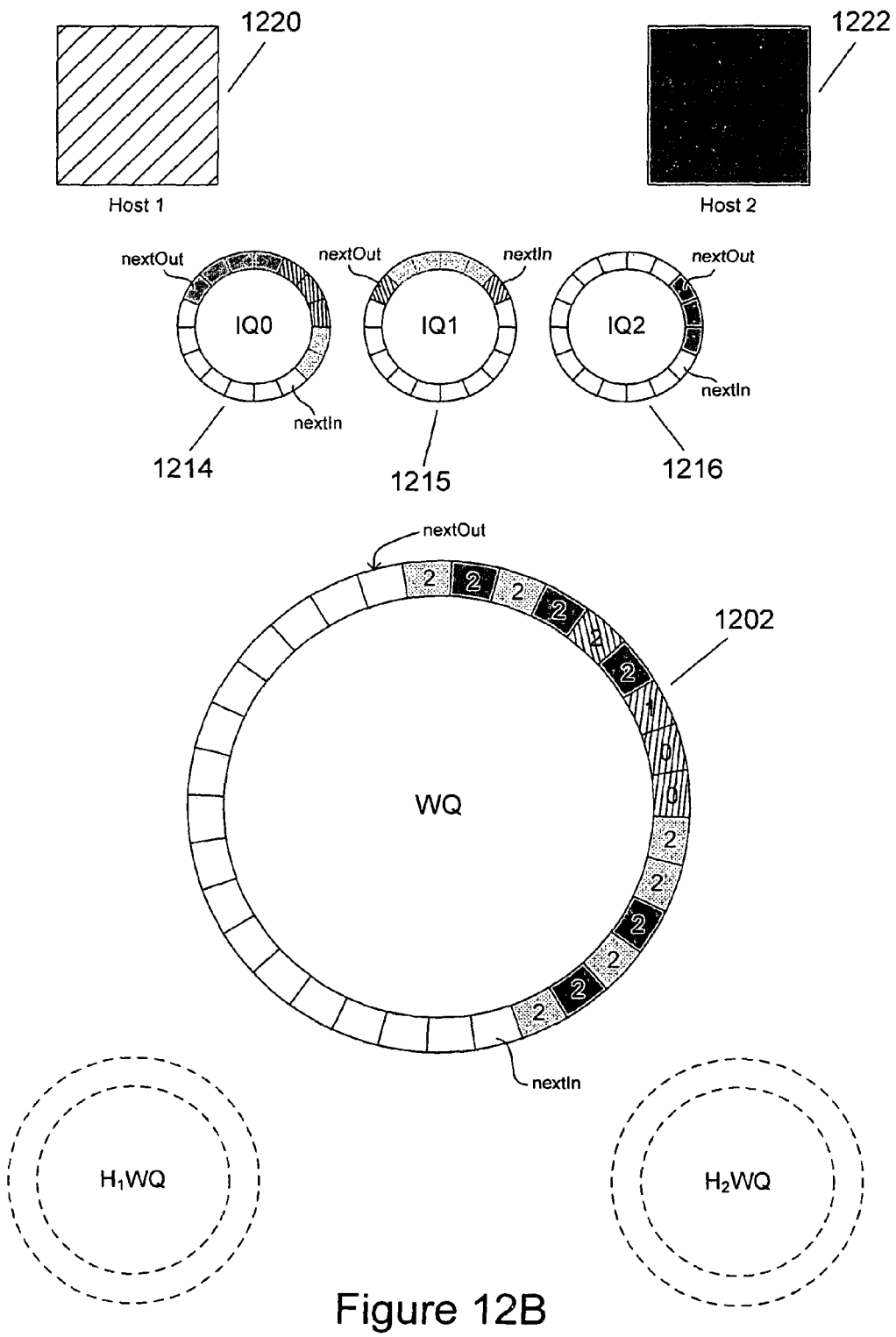

FIGS. 12A-B illustrate an example of numerous different types of priority-level starvation that may occur as a result of introduction of command-associated priorities. FIGS. 12A-B use the same illustration conventions as used in FIG. 7A-E and 8A-D. In FIG. 12A, the WQ 1202 is shown associated with two virtual host-specific WQs 1204 and 1206, as previously described, in turn associated with a first host computer 1208 and a second host computer 1210. However, due to the priority levels associated with commands, entries queued to the WQ are dequeued from one of a number of priority queues 1214-1216. FIG. 12B illustrates a case of priority-level starvation. In FIG. 12B, the highest-priority-level priority queue 1216 is shown to contain three high-priority commands received from host 2. Priority queues 1214 and 1215 both contain lower-priority commands received from both host 1 and host 2. However, the WQ 1202 contains only high-priority commands received from host 2 in addition to commands of various priorities received from host 1. In other words, two-tier throttling described with reference to FIGS. 8A-D and FIG. 9 is effectively keeping the depth of the WQ below the overload level, and are also ensuring that both hosts, host 1 1220 and host 2 1222, receive fair access to the array controller and fair command processing. However, because host 2 is issuing a large number of high-priority commands, only high-priority commands issued by host 2 are being executed, while lower-priority host 2 commands sit idle on the lower-priority queues 1214 and 1215.

Priority-level starvation, such as shown in FIG. 12B, may have serious consequences. For example, two or more different processes executing on host 2 may be interdependent, and may issue both high-priority commands and lower-priority commands to the data-storage system. It may turn out that a critical activity executing on host 2 may be blocked, waiting for a result from a different process that is waiting for execution of a lower-priority command issued to the data-storage system. Because of these interdependencies, the delay in execution of the lower-priority command is holding up progress of the critical process in host 2. Thus, the lower-priority command on which the critical process is waiting has an actual, desired priority greater than any of the higher-priority commands being issued by the host computer to the data-storage system. This is an example of priority inversion.

Figure 13:
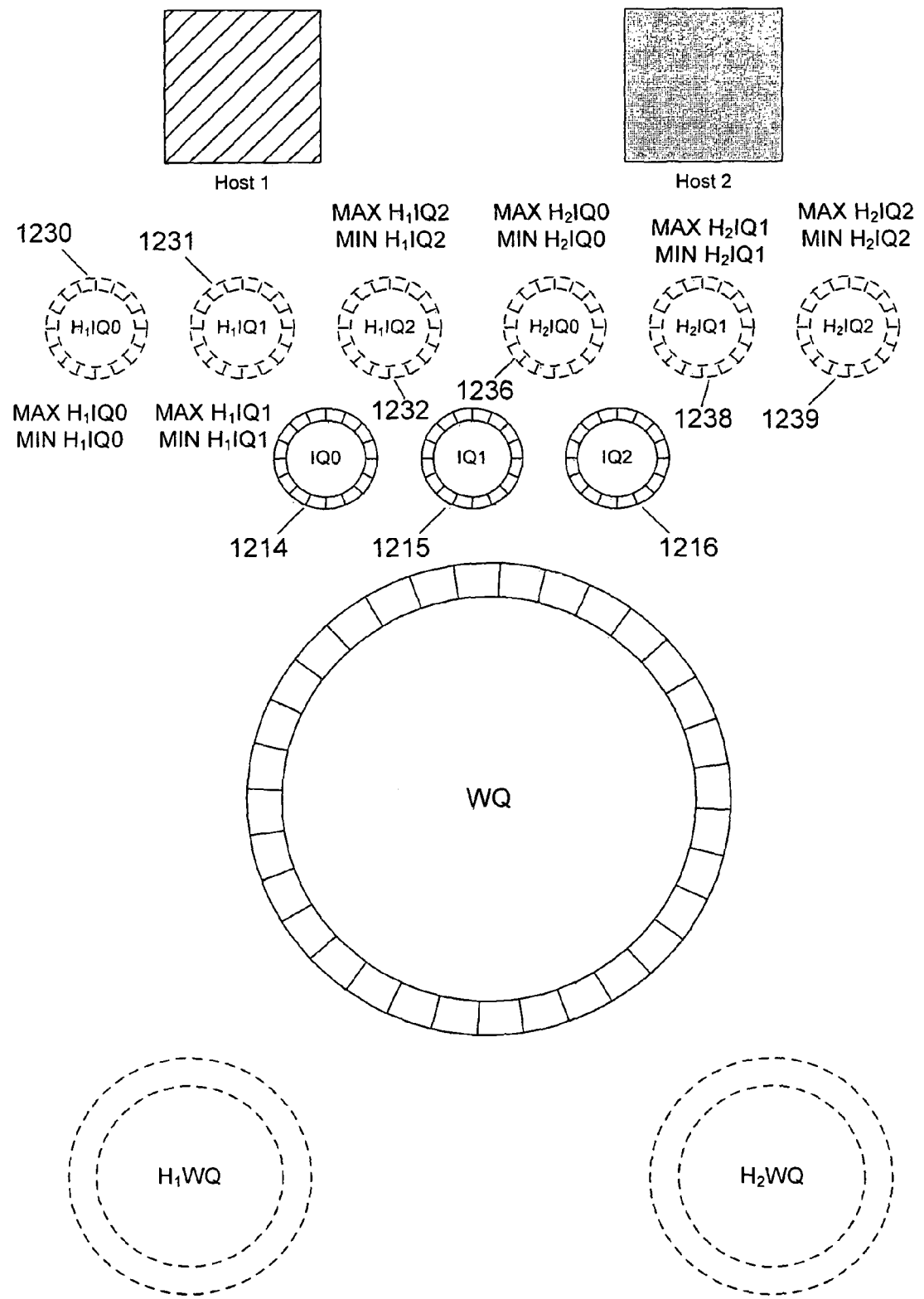
FIG. 13 illustrates one embodiment of the present invention that incorporates an additional throttling mechanism to prevent priority-level starvation.

FIG. 13 illustrates one embodiment of the present invention that incorporates an additional throttling mechanism to prevent priority-level starvation. As shown in FIG. 13, the array controller can view the three priority queues 1214-1216 as a composite of, or associated with, virtual sets of priority queues 1230-1232 and 1236-1239 associated with host computers accessing the array controller through the port associated with the WQ. Each virtual priority queue, such as host-specific virtual priority queue $H_1IQ0$ 1230, is associated with maximum and minimum depth parameters, similar to the association of maximum and minimum depth parameters with the host-specific WQs illustrated in FIG. 8D. These host-specific priority-queue parameters allow for throttling of commands based on priority level, in order to prevent priority-level starvation. As with the virtual, host-specific WQs, $H_iWQ$, the host-specific virtual priority queue $H_iIQX$ represent logic-based considerations made by the array controller in deciding whether or not to queue ready commands to a WQ, or to instead return busy responses. The positions of the host-specific virtual priority queue $H_iIQX$ in FIG. 13 are not meant to indicate an ordering of the priority-level considerations represented by the host-specific virtual priority queue $H_iIQX$ with those represented by the host-specific WQs, $H_iWQ$, but simply that these new consideration, which represent embodiments of the present inventions, are made by an array controller enhanced to manage priority-associated commands.

Figure 14:
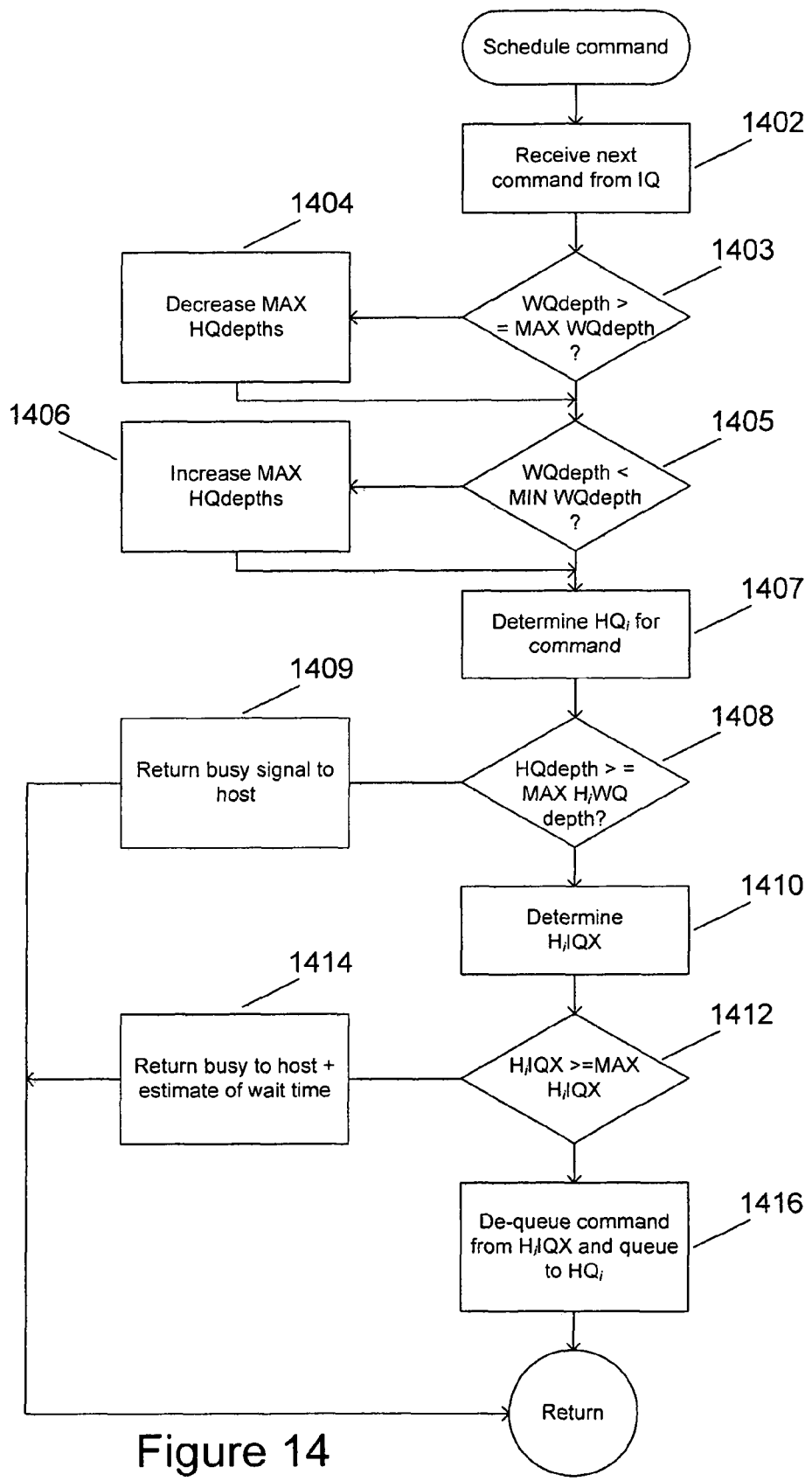
FIG. 14 is a control-flow diagram illustrating an enhanced routine "scheduleCommand" employed by the IQ-to-IQ$_p$ processing logic (1102 in FIG. 11) of an array controller that receives commands associated with priority levels.

FIG. 14 is a control-flow diagram illustrating an enhanced routine "scheduleCommand" employed by the IQ-to-$IQ_p$ processing logic (1102 in FIG. 11) of an array controller that receives commands associated with priority levels. The command "scheduleCommand" shown in FIG. 14 is an enhanced version of the routine "scheduleCommand" illustrated in FIG. 9. In fact, the first eight steps of the enhanced "scheduleCommand" routine, shown in FIG. 14, are identical to the first eight steps in the previously described routine "scheduleCommand," and will not be again discussed. Once the two throttling mechanisms, previously discussed with reference to FIG. 9, have been employed, up through steps 1408-1409, and the enhanced routine "scheduleCommand" has determined that a command should be queued to a virtual host-specific WQ, then, in step 1410, the enhanced routine "scheduleCommand" determines from which host-specific priority queue the command is being input to the WQ. If the host-specific priority queue with which the command is associated has greater than a maximum allowable queue depth, as determined in step 1412, then the command is not queued to the WQ, but a response is instead returned by the array controller to the host with an indication that the array controller is too busy to execute the command as well as an estimate of the time that the host computer should wait before re-issuing the command, in step 1414. The array controller may, in addition, change the maximum allowable queue depths associated with all or a portion of the host-specific priority queues, just as the array controller may change MAX $H_iWQ$depth parameters on a per-$H_iWQ$ basis, and may employ many additional considerations, including the recent history of busy responses, or command-execution refusals, sent by the array controller to the particular host and priority level via the port associated with the WQ, average host activities through the port associated with the WQ at the priority level, and other such considerations. In general, the array controller endeavors to communicate and cooperate with host computers, so that host computers can intelligently modify command-transmission rates, on a priority-level basis, in order to maximize command-processing service received from the disk-array while minimizing busy responses from the array controller. Achieving desirable and stable rates of command processing may involve constant adjustments made both by host computers and array controllers. FIG. 14 is not intended to detail all of these considerations and adjustments, which may vary from implementation to implementation and from system to system, but instead to show concept of priority-related command-reception throttling undertaken by the array controller. The time estimate returned by the array controller can be made based on command-processing rates, queue depths, and other information available to the array controller, and other considerations discussed above. The time may be a command-completion time. Otherwise, in step 1416, the enhanced routine "scheduleCommand" dequeues the command from the determined host-specific priority queue and queues the command to the determined virtual host-specific WQ. As with the previously described routine "scheduleCommand," queuing the command to the virtual host-specific WQ is essentially queuing of the command to the WQ with update of both virtual host-specific WQ and WQ pointers.

Although the present invention has been described in terms of particular embodiments, it is not intended that the invention be limited to these embodiments. Modifications within the spirit of the invention will be apparent to those skilled in the art. For example, embodiments of the present invention may be incorporated into any number of different types of array controllers within a multitude of different types of data-storage systems. Although one type of additional priority-level throttling mechanism suitable for a described, exemplary data-storage system is described above, a wide variety of different types of additional priority-level throttling may be implemented for other types of array-controller implementations within other types of data-storage systems. Embodiments of the present invention may be implemented in hardware, firmware, software, or a combination of two or more of hardware circuits, firmware, and software. Embodiments of the present invention may differ in the control structures used, data structures used, modular organizations, programming languages, and various other implementation characteristics and parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An array controller comprising:
   ports associated with one or more first communications media that link the array controller to one or more host computers;
   ports associated with one or more second communications media that link the array controller to one or more data-storage targets; and
   array-controller logic that
      receives commands with associated priority levels from host computers through the first communications media, wherein each command includes within the command a priority field storing an associated priority level and wherein the associated priority level corresponds to a priority level within a host computer associated with the command,
      queues received commands according to the priorities associated with the commands to an internal work queue, from which they are subsequently processed for delivery to the data-storage targets,
      throttles command reception from host computers in order to control an overall command-reception rate,
      throttles command reception from individual host computers in order to provide fair access to all host computers accessing the array controller, and
      throttles command reception from one or more of all host computers according to the associated priority levels in order to provide fair access to each priority level in each host computer of all host computers accessing the array controller.

2. The array controller of claim 1 wherein the array-controller throttles command reception by:
for each received command,
determining whether the received command can be processed;
when the received command can be processed, queuing the received command to the internal work queue; and
when the received command cannot be processed, returning a busy response to the host computer that sent the command to the array controller.

3. The array controller of claim 2 wherein the array-controller, in order to throttle command reception from host computers in order to control an overall command-reception rate, determines whether each received command can be processed by:
determining whether more than a threshold number of entries are currently queued to the work queue.

4. The array controller of claim 2 wherein the array-controller, in order to throttle command reception from individual host computers in order to provide fair access to all host computers accessing the array controller, determines whether each received command can be processed by:
determining whether more than a threshold number of entries representing commands received from a particular host computer that sent the received command are currently queued to the work queue.

5. The array controller of claim 4 wherein the array controller, in determining whether each received command can be processed, further considers a rate of busy-response return to the particular host computer, average rate of command reception from active host computers, and additional command-reception-rate and command-processing-bandwidth considerations.

6. The array controller of claim 2 wherein the array-controller, in order to throttle command reception from host computers according to associated priorities in order to provide fair access to all priority levels of all host computers accessing the array controller, determines whether each received command can be processed by:
determining whether more than a threshold number of entries representing commands received from a particular priority level of the particular host computer that sent the received command are currently queued to the work queue.

7. The array controller of claim 6 wherein the array controller, in determining whether each received command can be processed, further considers a rate of busy-response return to particular priority levels of the particular host computer, average rate of command reception from various priority levels of active host computers, and additional priority-level-related command-reception-rate and command-processing-bandwidth considerations.

8. The array controller of claim 1 wherein the array controller throttles command reception independently for each port associated with one or more first communications media.

9. A method for managing command-reception rates in an array controller that includes ports associated with one or more first communications media that link the array controller to one or more host computers, ports associated with one or more second communications media that link the array controller to one or more data-storage targets, and array-controller logic, the method comprising:
receiving commands with associated priority levels from host computers through the first communications media, wherein each command includes within the command a priority field storing an associated priority level and wherein the associated priority level corresponds to a priority level within a host computer associated with the command,
queuing received commands according to the priorities associated with the commands to an internal work queue, from which they are subsequently processed for delivery to the data-storage targets,
throttling command reception from host computers in order to control an overall command-reception rate,
throttling command reception from individual host computers in order to provide fair access to all host computers accessing the array controller, and
throttling command reception from one or more of all host computers according to the associated priority levels in order to provide fair access to each priority level in each host computer of all host computers accessing the array controller.

10. The method of claim 9 further including throttling command reception by:
for each received command,
determining whether the received command can be processed;
when the received command can be processed, queuing the received command to the internal work queue; and
when the received command cannot be processed, returning a busy response to the host computer that sent the command to the array controller.

11. The method of claim 10 wherein, in order to throttle command reception from host computers in order to control an overall command-reception rate, determining whether each received command can be processed by:
determining whether more than a threshold number of entries are currently queued to the work queue.

12. The method of claim 10 wherein, in order to throttle command reception from individual host computers in order to provide fair access to all host computers accessing the array controller, determining whether each received command can be processed by:
determining whether more than a threshold number of entries representing commands received from a particular host computer that sent the received command are currently queued to the work queue.

13. The method of claim 12 wherein, in determining whether each received command can be processed, further considering a rate of busy-response return to the particular host computer, average rate of command reception from active host computers, and additional command-reception-rate and command-processing-bandwidth considerations.

14. The method of claim 10 wherein, in order to throttle command reception from host computers according to associated priorities in order to provide fair access to all priority levels of all host computers accessing the array controller, determining whether each received command can be processed by:
determining whether more than a threshold number of entries representing commands received from a particular priority level of the particular host computer that sent the received command are currently queued to the work queue.

15. The method of claim 14 wherein, in determining whether each received command can be processed, further considering a rate of busy-response return to particular priority levels of the particular host computer, average rate of command reception from various priority levels of active host computers, and additional priority-level-related command-reception-rate and command-processing-bandwidth considerations.

16. The method of claim 9 further including throttling command reception independently for each port associated with one or more first communications media.

17. Processor instructions stored in a computer readable memory that implement the method of claim 9.

18. Firmware instructions stored in a computer readable memory that implement the method of claim 9.

* * * * *

UNITED STATES PATENT AND TRADEMARK OFFICE
CERTIFICATE OF CORRECTION

| | | |
|---|---|---|
| PATENT NO. | : 7,797,468 B2 | Page 1 of 1 |
| APPLICATION NO. | : 11/590957 | |
| DATED | : September 14, 2010 | |
| INVENTOR(S) | : George Shin et al. | |

It is certified that error appears in the above-identified patent and that said Letters Patent is hereby corrected as shown below:

In column 13, lines 53-54, in Claim 7, delete "level- related" and insert -- level-related --, therefor.

Signed and Sealed this
Fifth Day of April, 2011

David J. Kappos
*Director of the United States Patent and Trademark Office*